United States Patent
Son et al.

(10) Patent No.: US 10,886,623 B2
(45) Date of Patent: Jan. 5, 2021

(54) ELECTRONIC DEVICE INCLUDING A PLURALITY OF SWITCHES SELECTIVELY CONNECTING ANTENNA HAVING A PLURALITY OF FEEDING TERMINALS WITH COMMUNICATION CIRCUIT, AND DRIVING METHOD THEREOF

(71) Applicant: Samsung Electronics Co., Ltd., Suwon-si (KR)

(72) Inventors: Junghwan Son, Suwon-si (KR); Jiyong Kim, Suwon-si (KR); Hyoseok Na, Suwon-si (KR); Yongjun An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 16/444,311

(22) Filed: Jun. 18, 2019

(65) Prior Publication Data
US 2019/0386397 A1  Dec. 19, 2019

(30) Foreign Application Priority Data

Jun. 19, 2018  (KR) .................... 10-2018-0069994

(51) Int. Cl.
*H01Q 21/00*  (2006.01)
*H01Q 5/10*   (2015.01)
(Continued)

(52) U.S. Cl.
CPC ....... *H01Q 21/0006* (2013.01); *H01Q 1/2283* (2013.01); *H01Q 5/10* (2015.01); *H01Q 21/061* (2013.01)

(58) Field of Classification Search
CPC ............ H01Q 21/00; H01Q 5/10; H01Q 1/22; H01Q 21/06
(Continued)

(56) References Cited

U.S. PATENT DOCUMENTS 6,992,621 B2   1/2006  Casas et al.
9,838,046 B2  12/2017  Lum et al.
(Continued)

FOREIGN PATENT DOCUMENTS

JP    2002-164704    6/2002

OTHER PUBLICATIONS

Extended Search Report dated Oct. 23, 2019 in counterpart European Patent Application No. 19181223.9.

*Primary Examiner* — Andrea Lindgren Baltzell
(74) *Attorney, Agent, or Firm* — Nixon & Vanderhye, P.C.

(57) ABSTRACT

Disclosed is an electronic device. The electronic device includes an antenna including a radiation part comprising a radiator having a patch shape, a first feeding port provided in a first direction of the radiation part, a second feeding port provided in a second direction perpendicular to the first direction of the radiation part, a third feeding port provided in a direction facing away from the first direction, and a fourth feeding port provided in a direction facing away from the second direction, a wireless communication circuit that includes a first communication circuit and a second communication circuit, the first communication circuit including a first transmitter and a first receiver and the second communication circuit including a second transmitter and a second receiver, a first switch configured to selectively connect the first transmitter and the first receiver with the first feeding port, a second switch configured to selectively connect the first transmitter and the first receiver with the second feeding port, a third switch configured to selectively connect the second transmitter and the second receiver with the third feeding port, and a fourth switch configured to selectively connect the second transmitter and the second receiver with the fourth feeding port.

22 Claims, 18 Drawing Sheets

(51) Int. Cl.
*H01Q 1/22* (2006.01)
*H01Q 21/06* (2006.01)
(58) Field of Classification Search
USPC .......................................... 343/876
See application file for complete search history.

(56) References Cited

U.S. PATENT DOCUMENTS

| | | |
|---|---|---|
| 2013/0016633 A1 | 1/2013 | Lum et al. |
| 2015/0123873 A1* | 5/2015 | Perumana .............. H01Q 21/30 |
| | | 343/876 |
| 2016/0112073 A1* | 4/2016 | Lum .................... H04B 1/0057 |
| | | 370/297 |
| 2017/0126257 A1 | 5/2017 | Wang et al. |
| 2017/0338854 A1* | 11/2017 | Perumana ................ H04B 1/56 |

* cited by examiner

ELECTRONIC DEVICE INCLUDING A PLURALITY OF SWITCHES SELECTIVELY CONNECTING ANTENNA HAVING A PLURALITY OF FEEDING TERMINALS WITH COMMUNICATION CIRCUIT, AND DRIVING METHOD THEREOF

CROSS-REFERENCE TO RELATED APPLICATION

This application is based on and claims priority under 35 U.S.C. § 119 to Korean Patent Application No. 10-2018-0069994, filed on Jun. 19, 2018, in the Korean Intellectual Property Office, the disclosure of which is incorporated by reference herein its entirety.

BACKGROUND

1. Field

The disclosure relates to a technology for improving reception performance and transmission performance in an environment where a signal that is received or transmitted by an antenna array is polarized in a specific direction or where strength of the signal that is received or transmitted by the antenna array is weak.

2. Description of Related Art

As mobile communication technologies develop, an electronic device, which is equipped with an antenna, such as a smartphone, a wearable device, or the like is widely supplied. The electronic device may receive or transmit a signal including data (e.g., a message, a photo, a video, a music file, a game, and the like) through the antenna. In the electronic device, a signal that is received using the antenna is provided to a radio frequency integrated circuit (RFIC).

The antenna of the electronic device is implemented using a plurality of antenna elements for the purpose of receiving or transmitting a signal more efficiently. For example, the electronic device may include one or more antenna arrays in each of which a plurality of antenna elements are arranged in a regular shape. The antenna array has an effective isotropically radiated power (EIRP) greater than one antenna element. As such, the electronic device that includes the antenna array may receive or transmit a signal efficiently.

Also, the electronic device that includes the antenna array supports a multiple input multiple output (MIMO) technology using a plurality of antenna elements. The electronic device that supports the MIMO technology may receive and output multiple signals, thus improving signal throughput. The electronic device may establish a plurality of path that transfer signals from the antenna array to the RFIC.

The above information is presented as background information only to assist with an understanding of the disclosure. No determination has been made, and no assertion is made, as to whether any of the above might be applicable as prior art with regard to the disclosure.

A signal that is received by an electronic device may be polarized in a specific direction. To receive or transmit a vertically polarized signal or a horizontally polarized signal, the electronic device may physically separate the plurality of paths based on a direction in which a signal is polarized. For example, the electronic device may separate antenna elements receiving a signal and antenna elements transmitting a signal, for the purpose of supporting the MIMO technology with a plurality of paths. In the case where the antenna elements receiving a signal and the antenna elements transmitting a signal are separated from each other, it may be impossible to efficiently utilize the antenna elements in a time division duplex (TDD) environment.

For another example, the electronic device may receive or transmit a vertically polarized signal and a horizontally polarized signal through one antenna element using a switch in an RF integrated circuit. Signals that are polarized in different directions may be input and output using a plurality of feeding ports that are positioned in different directions with respect to a radiation part of an antenna element. The plurality of feeding ports may be connected with different paths, respectively. In this case, it may be impossible to utilize a part of paths in an environment where a signal that is received or transmitted by an antenna of the electronic device is polarized in a specified direction or where strength of the signal that is received or transmitted by the antenna is weak.

In detail, a signal is mostly received by a vertical polarization path, and a signal is received weakly through a horizontal polarization path in an environment where strength of the signal coming to the horizontal polarization path is weak. The electronic device fails to control feeding ports respectively positioned at antenna elements, thus failing to change reception strength or phase of the horizontal polarization path or failing to turn off a path itself. As such, the electronic device maintains a state where a signal is weakly received through the horizontal polarization path. Also, a path through which a signal is weakly received maintains a turn-on state. In the case of supporting the MIMO technology in a weak electric field environment, the electronic device has to supply a power to antenna elements receiving a signal weakly. As such, the electronic device that supports the MIMO technology may unnecessarily supply a power to a plurality of antenna elements, thereby wasting a power (or causing an increase of power consumption).

SUMMARY

In accordance with an example aspect of the disclosure, an electronic device may include an antenna that includes a radiation part including a radiator having a patch shape, a first feeding port provided in a first direction of the radiation part, a second feeding port provided in a second direction perpendicular to the first direction of the radiation part, a third feeding port provided a direction facing away from the first direction, and a fourth feeding port provided in a direction facing away from the second direction, a wireless communication circuit comprising a first communication circuit including a first transmitter and a first receiver and a second communication circuit including a second transmitter and a second receiver, a first switch configured to selectively connect the first transmitter and the first receiver with the first feeding port, a second switch configured to selectively connect the first transmitter and the first receiver with the second feeding port, a third switch configured to selectively connect the second transmitter and the second receiver with the third feeding port, and a fourth switch configured to selectively connect the second transmitter and the second receiver with the fourth feeding port.

In accordance with another example aspect of the disclosure, an electronic device may include an antenna that includes a radiation part including a radiator having a patch shape, a first feeding port provided in a first direction of the radiation part, and a second feeding port provided in a second direction perpendicular to the first direction of the radiation part, a wireless communication circuit comprising a first communication circuit including a first transmitter and a first receiver configured to use a specified frequency and a second communication circuit including a second transmitter and a second receiver configured to use the specified frequency, a first switch configured to selectively connect the first transmitter and the first receiver with the first feeding port through a first wire path having a first specified length with regard to the specified frequency, a second switch configured to selectively connect the second transmitter and the second receiver with the second feeding port through a second wire path having a second specified length with regard to the specified frequency, and a third switch configured to selectively connect the second transmitter with the first feeding port through a third wire path wherein a phase is delayed in comparison to the first specified length by as much as 90 degrees based on a communication state associated with the wireless communication circuit.

In accordance with another example aspect of the disclosure, an electronic device may include an antenna that includes a radiation part comprising a radiator having a patch shape, a first feeding port provided in a first direction of the radiation part, and a second feeding port provided in a second direction perpendicular to the first direction of the radiation part, a wireless communication circuit comprising a first communication circuit including a first transmitter and a first receiver and a second communication circuit including a second transmitter and a second receiver, a first switch configured to selectively connect the first transmitter and the first receiver with the first feeding port, a second switch configured to selectively connect the second transmitter and the second receiver with the second feeding port, and a third switch configured to selectively connect the second transmitter with the first feeding port based on a communication state associated with the wireless communication circuit.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Hereinafter, various example embodiments of the disclosure will be described with reference to accompanying drawings. However, those of ordinary skill in the art will recognize that various modifications, equivalents, and/or alternatives on various example embodiments described herein can be variously made without departing from the scope and spirit of the disclosure.

Figure 1:
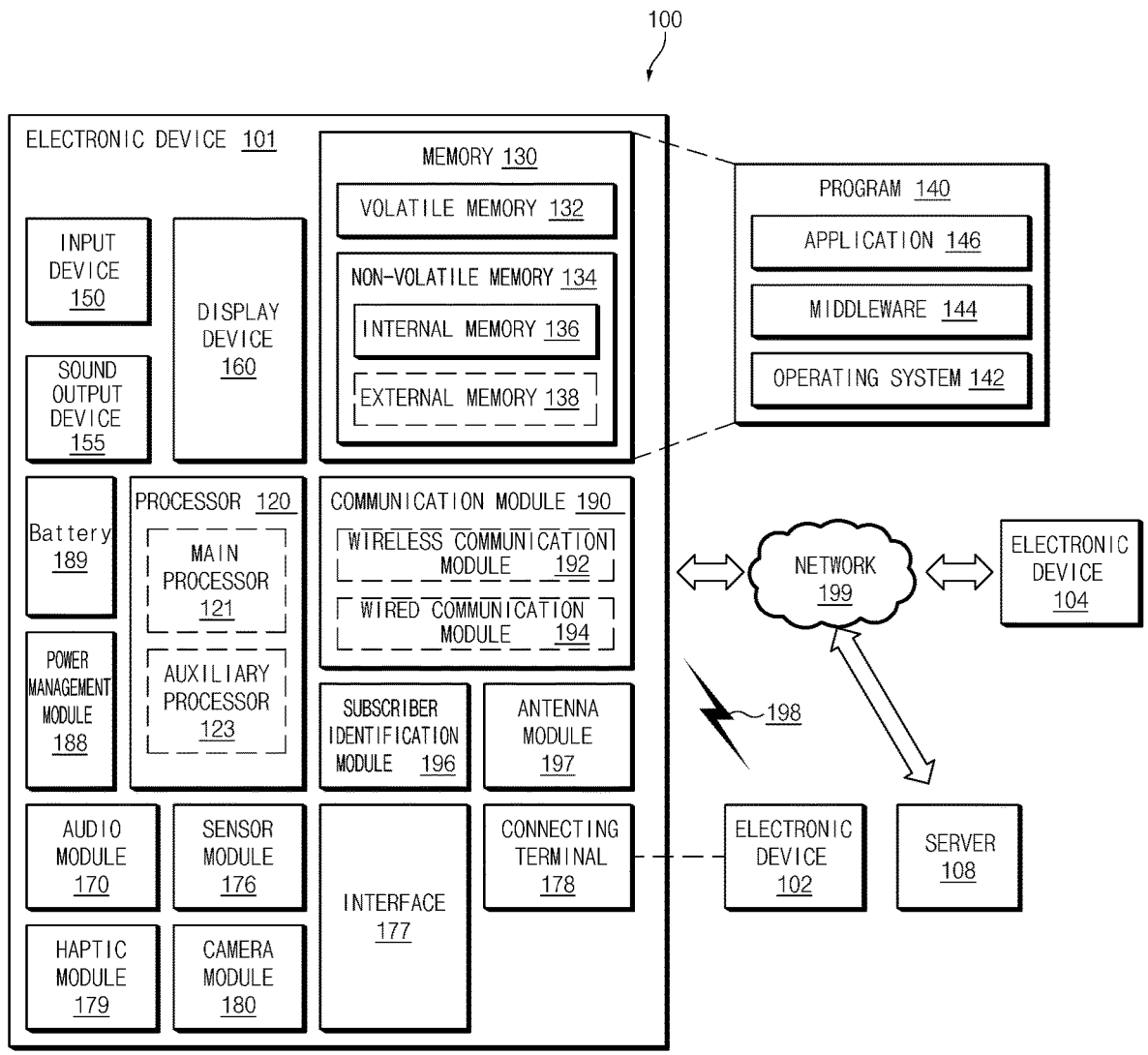
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
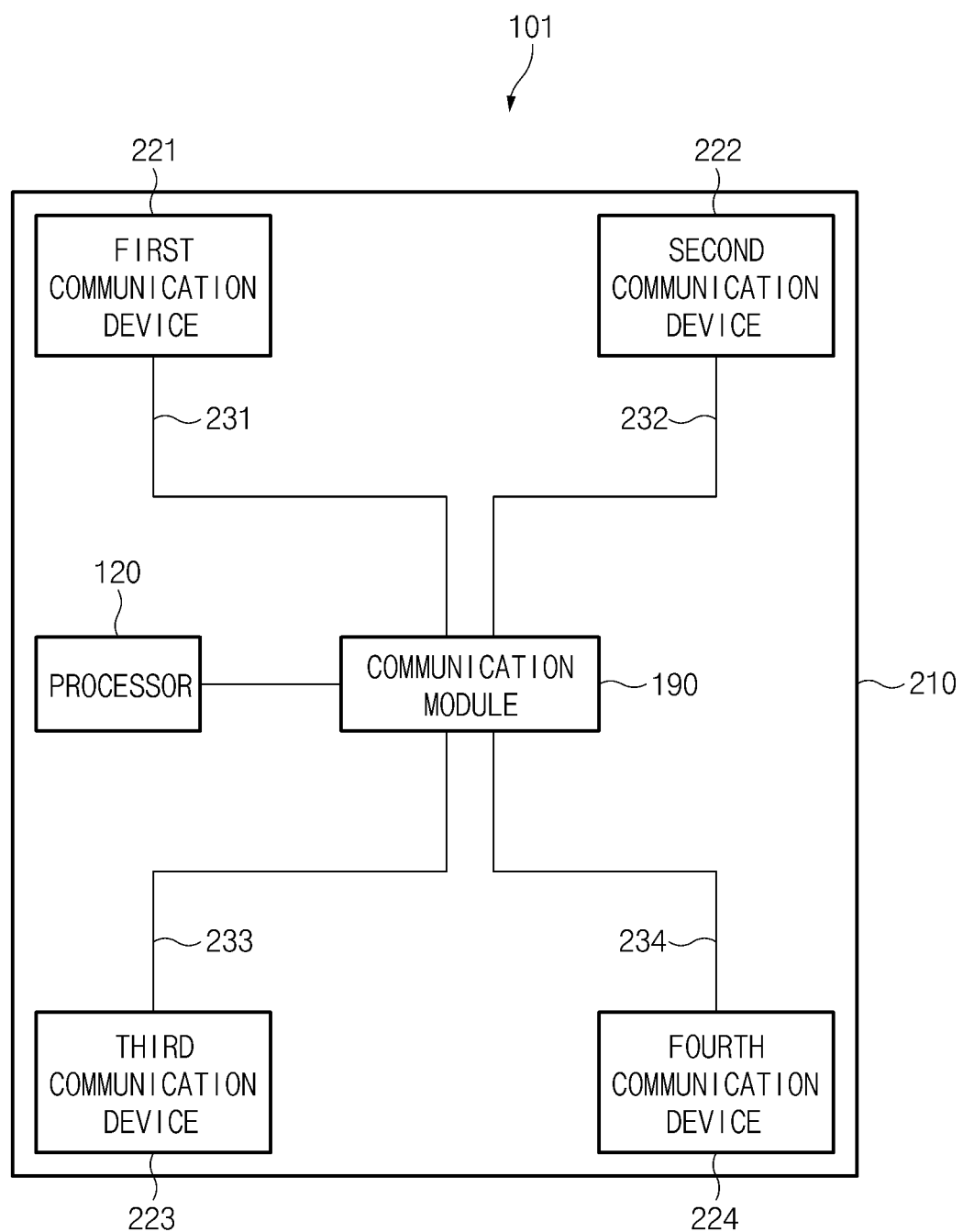
FIG. 2 is a block diagram illustrating an example electronic device supporting 5G communication, according to an embodiment.

FIG. 2 is a block diagram illustrating an example electronic device 101 supporting 5G communication, according to an embodiment.

Referring to FIG. 2, the electronic device 101 (e.g., the electronic device 101 of FIG. 1) may include a housing 210, the processor (e.g., including processing circuitry) 120 (e.g., the processor 120 of FIG. 1), the communication module (e.g., including communication circuitry) 190 (e.g., the communication module 190 of FIG. 1), at least one communication device (e.g., including communication circuitry) 221, 222, 223, and/or 224, and at least one conductive line 231, 232, 233, and/or 234.

In an embodiment, the housing 210 may protect any other components of the electronic device 101. The housing 210 may include a front plate, a back plate facing away from the front plate, and a side member (or a metal frame) surrounding a space between the front plate and the back plate. The side member may be attached to the back plate or may be integrally formed with the back plate.

In an embodiment, the electronic device 101 may include the at least one communication device 221, 222, 223, and/or 224, each of which include various communication circuitry. For example, the electronic device 101 may include the first communication device 221, the second communication device 222, the third communication device 223, and the fourth communication device 224.

In an embodiment, the first to fourth communication devices 221 to 224 may be positioned within the housing 210. The first to fourth communication devices 221 to 224 may, for example, and without limitation, up-convert and/or down-convert a frequency. For example, the first communication device 221 may up-convert an intermediate frequency (IF) signal received through the first conductive line 231. For another example, the first communication device 221 may down-convert a millimeter wave (mmWave) signal received through an antenna array, and may transmit the down-converted signal using the first conductive line 231.

In an embodiment, through the conductive lines 231 to 234, the first to fourth communication devices 221 to 224 may provide a signal directly to the processor 120 and/or may receive a signal directly from the processor 120. In this case, the communication module 190 may not be included or may be integrated in the processor 120.

In an embodiment, the processor 120 may include various processing circuitry, such as, for example, and without limitation, at least one of a central processing unit (CPU), an application processor (AP), a graphic processing unit (GPU), an image signal processor (ISP) of a camera, or the like. According to an embodiment, the processor 120 may be implemented with a system on chip (SoC) or a system in package (SiP).

In an embodiment, the communication module 190 may include various communication circuitry and be electrically connected with at least one communication device 221, 222, 223, and/or 224 using at least one conductive line 231, 232, 233, and/or 234. For example, the communication module 190 may be electrically connected with the first communication device 221, the second communication device 222, the third communication device 223, and the fourth communication device 224 using the first conductive line 231, the second conductive line 232, the third conductive line 233, and the fourth conductive line 234, respectively. The communication module 190 may include various communication circuitry, such as, for example, and without limitation, a baseband processor (BP), a communication processor (CP), a radio frequency integrated circuit (RFIC), an inter frequency integrated circuit (IFIC), or the like.

In an embodiment, the first conductive line 231, the second conductive line 232, the third conductive line 233, and the fourth conductive line 234 may include, for example, and without limitation, a coaxial cable and/or a flexible printed circuit board (FPCB), or the like.

In an embodiment, the communication module 190 may include a first BP and/or a second BP. The electronic device 101 may further include one or more interfaces (e.g., the interface 177 of FIG. 1) for supporting inter-chip communication between the first BP and/or the second BP and the processor 120. For example, the processor 120 and the first BP and/or the second BP may transmit/receive data using an inter-chip interface (e.g., an inter processor communication channel). For another example, in the case where the communication module 190 is integrated in the processor 120, the processor 120 may be implemented through a combination of the AP and the BP or CP.

In an embodiment, the first BP or the second BP may provide an interface for performing communication with any other entities. The first BP may support, for example, wireless communication with regard to a first network (e.g., the first network 198 of FIG. 1). The second BP may support, for example, wireless communication with regard to a first network (e.g., the second network 199 of FIG. 2).

In an embodiment, the first BP or the second BP may form one module with the processor 120. For example, the first BP or the second BP may be integrally formed with the processor 120. For another example, the first BP or the second BP may be positioned within one chip or may be implemented in the form of an independent chip. According to an embodiment, the processor 120 and at least one BP (e.g., the first BP) may be integrally formed within one chip (e.g., a SoC), and any other BP (e.g., the second BP) may be implemented in the form of an independent chip.

In an embodiment, the first network or the second network may correspond to the network 198 or 199 of FIG. 1. According to an embodiment, each of the first network and the second network may include, for example, and without limitation, a 4$^{th}$ generation (4G) network, a 5$^{th}$ generation (5G) network, or the like. The 4G network may support, for example, a long term evolution (LTE) protocol defined in the 3GPP. The 5G network may support, for example, a new radio (NR) protocol defined in the 3GPP.

A position and the number of the at least one communication device 221, 222, 223, and/or 224 illustrated in FIG. 2 may be an example. The at least one communication device 221, 222, 223, and/or 224 may be positioned in an edge area of one side of the electronic device 101. However, the disclosure is not limited thereto. For example, the at least one communication device 221, 222, 223, and/or 224 may be positioned within the electronic device 101. Also, the at least one communication device 221, 222, 223, and/or 224 may include four or more communication devices or three or less communication devices.

Figure 3:
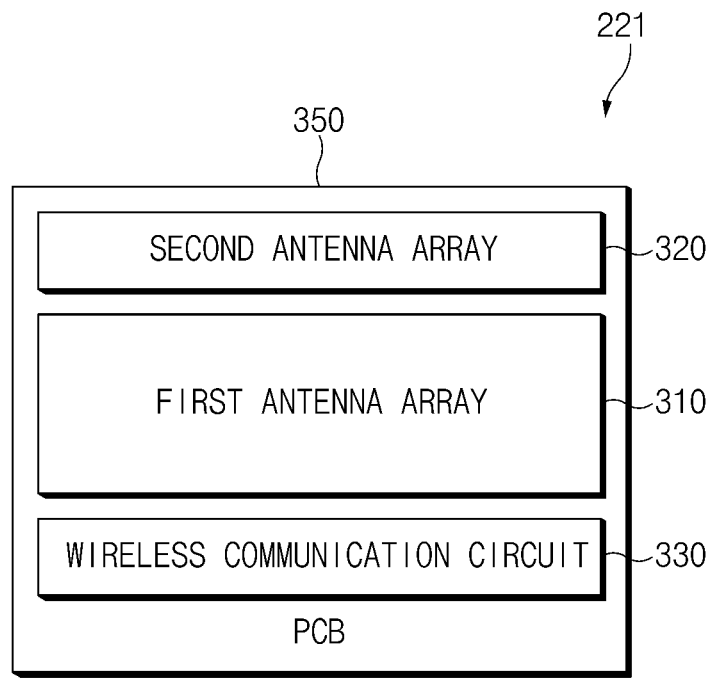
FIG. 3 is a block diagram illustrating an example communication device according to an embodiment.

FIG. 3 is a block diagram illustrating an example communication device (e.g., the first communication device 221 of FIG. 2) according to an embodiment.

Referring to FIG. 3, the communication device 221 may include at least one antenna array (e.g., at least one of a first antenna array 310 or a second antenna array 320), a wireless communication circuit 330 (e.g., an RFIC), and a printed circuit board (PCB) 350.

In an embodiment, the at least one antenna array 310 and/or 320 and/or the wireless communication circuit 330 may be positioned on the PCB 350. For example, the first antenna array 310 and/or the second antenna array 320 may be positioned on a first surface of the PCB 350, and the wireless communication circuit 330 may be positioned on a second surface of the PCB 350, which is opposite to the first surface. The PCB 350 may include a connector (e.g., a coaxial cable connector or a board to board (B-to-B) connector) for electrical connection with any other PCB (e.g., a PCB on which the communication module 190 of FIG. 2 is positioned) using a transmission line (e.g., at least one of the first to fourth conductive lines 231 to 234 of FIG. 2). For example, the PCB 350 may be connected with any other PCB with a transmission line using a connector. The transmission line may be used to transfer an RF signal (e.g., a millimeter wave (mmWave) signal) or transmit and receive IF signals. For another example, a power or any other control signal may be transferred through the connector.

In an embodiment, each of the first antenna array 310 and the second antenna array 320 may include at least one antenna element. Each antenna element may, for example, and without limitation, be a patch antenna, a shorted patch antenna, a dipole antenna, a loop antenna, a slot antenna, or the like. For example, all the antenna elements that the first antenna array 310 and the second antenna array 320 may be patch antennas. For another example, the antenna element included in the first antenna array 310 may be a patch antenna that performs beamforming toward a back plate, and the antenna element included in the second antenna array 320 may be a dipole antenna that performing beamforming toward a side member of the electronic device 101.

In an embodiment, the wireless communication circuit 330 may support a frequency band ranging from about 24 GHz to about 30 GHz or from about 37 GHz to about 40 GHz. The wireless communication circuit 330 may up-convert or down-convert a frequency. For example, the wireless communication circuit 330 may up-convert an IF signal received from the communication module 190 through the transmission line. For another example, the wireless communication circuit 330 may down-convert a millimeter wave signal received through the first antenna array 310 or the second antenna array 320 and may provide the down-converted signal to the communication module 190 through the transmission line.

Figure 4:
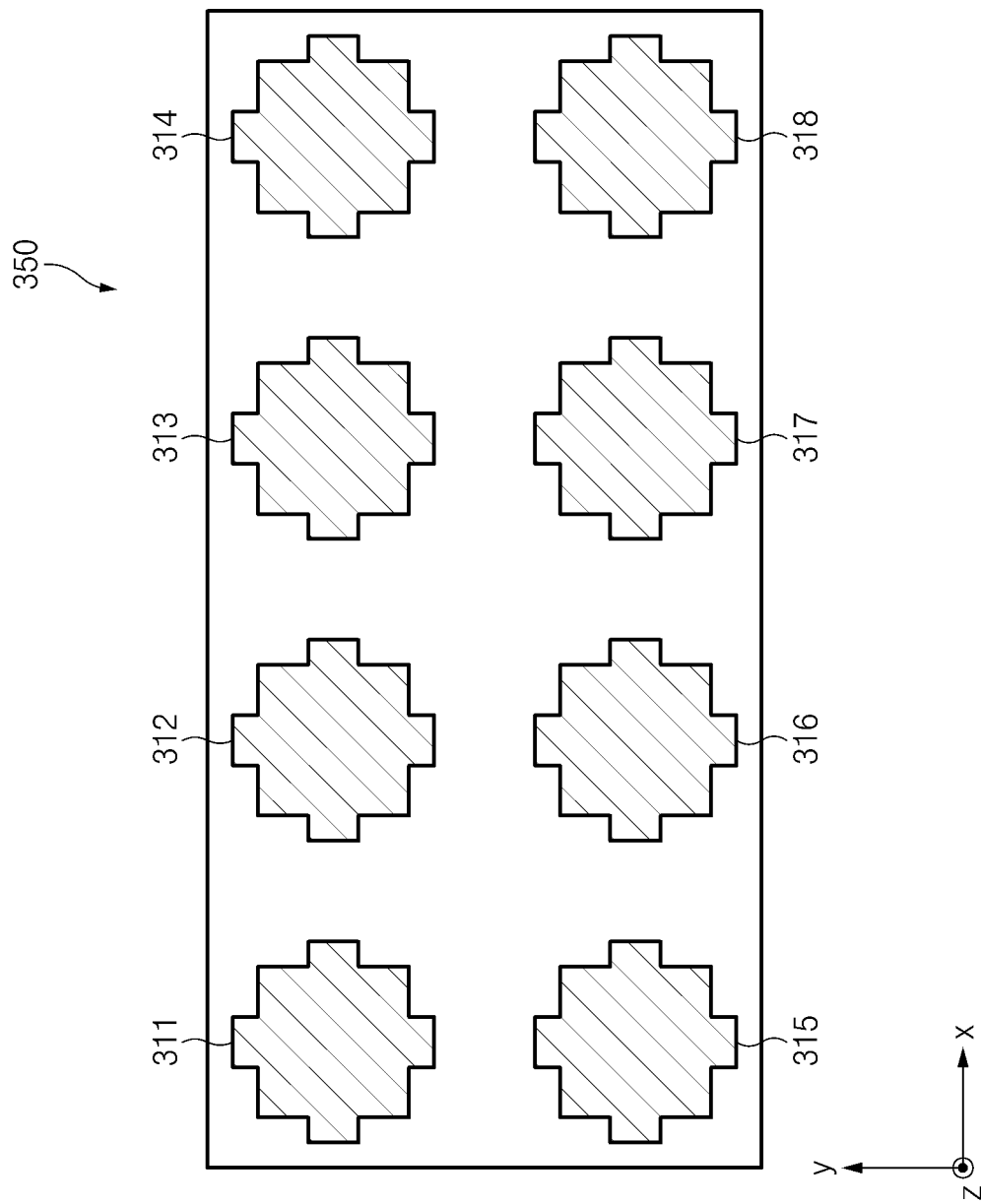
FIG. 4 is a diagram illustrating a plurality of example antenna elements on a printed circuit board according to an embodiment.

FIG. 4 is a diagram illustrating a plurality of example antenna elements 311, 312, 313, 314, 315, 316, 317 and 318 (which may be hereinafter referred to as antenna elements 311 to 318) on the PCB 350 according to an embodiment.

In an embodiment, the plurality of antenna elements 311 to 318 may be positioned on one surface of the PCB 350. An example is illustrated in FIG. 4 as the number of the plurality of antenna elements 311 to 318 is "8". However, the disclosure is not limited thereto. For example, the number of the plurality of antenna elements 311 to 318 may be more or less than 8. The plurality of antenna elements 311 to 318 may be positioned to have a specified height from the PCB 350 in a Z-axis direction. For example, the Z-axis direction may be a direction facing the back plate of the electronic device 101.

In an embodiment, the plurality of antenna elements 311 to 318 may be arranged in an X-axis direction as much as the specified number or may be arranged in a Y-axis direction perpendicular to the X-axis direction as much as the specified number. The plurality of antenna elements 311 to 318 may be arranged to form one or more rows and/or columns. For example, the four antenna elements 311, 312, 313, 314 (which may be referred to hereinafter as 311 to 314) that are arranged adjacent to an upper edge of the PCB 350 may form a first row, and the four antenna elements 315, 316, 317, 318 (which may be referred to hereinafter as 315 to 318) that are arranged adjacent to a lower edge of the PCB 350 may form a second row.

In an embodiment, the plurality of antenna elements 311 to 318 may include at least one antenna array of the first antenna array 310 and the second antenna array 320. For example, the plurality of antenna elements 311 to 318 may comprise the first antenna array 310. In this case, the first antenna array 310 may include the 8 antenna elements 311 to 318. For another example, the antenna elements 311 to 314 in the first row may comprise the first antenna array 310, and the antenna elements 315 to 318 in the second row may comprise the second antenna array 320.

In an embodiment, each of the plurality of antenna elements 311 to 318 may include a radiation part that is formed (e.g., provided) in a patch shape. Each of the antenna elements 311 to 318 may, for example, be a patch antenna. The patch-shaped radiation part may be formed adjacent to at least one side or at least one edge.

In an embodiment, the radiation part of each of the plurality of antenna elements 311 to 318 may, for example, be formed in a quadrilateral patch shape or a circular patch shape. The patch-shaped radiation part may have a length, a width, and a height that are designated according to a frequency that the electronic device 101 uses for wireless communication.

In an embodiment, each of the plurality of antenna elements 311 to 318 may include at least one feeding port. The feeding port may protrude from at least a portion (e.g., one end) of an edge of the radiation part in the X-axis or Y-axis direction.

Figure 5:
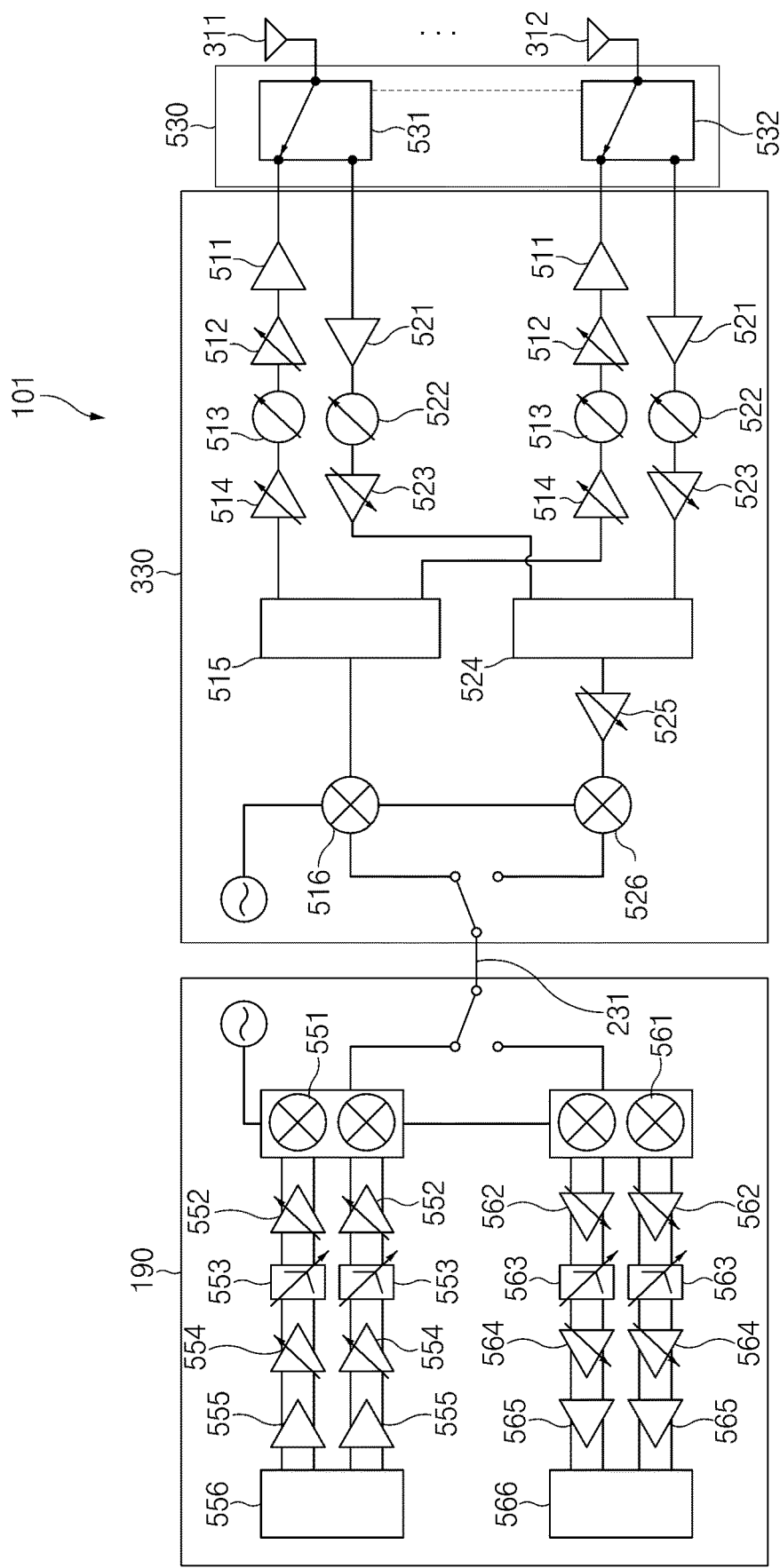
FIG. 5 is a diagram illustrating an example communication module, a plurality of example antenna elements, and an example wireless communication circuit of an electronic device according to an embodiment.

FIG. 5 is a diagram illustrating the communication module 190, the plurality of antenna elements 311 and 312, and the wireless communication circuit 330 of the electronic device 101.

In an embodiment, the wireless communication circuit 330 that transmits a transmit signal and receives a receive signal may be interposed between the communication module 190 and the plurality of antenna elements 311 and 312. The communication module 190 and the plurality of antenna elements 311 and 312 may be electrically connected through the wireless communication circuit 330. In the disclosure, the wireless communication circuit 330 may also be referred to as an "RFIC". Also, in the disclosure, the communication module 190 may also be referred to as an "IFIC".

In an embodiment, the plurality of antenna elements 311 and 312 may be connected with the wireless communication circuit 330 through a switching unit 530 including a plurality of switches 531 and 532. In the case where the electronic device 101 transmits a signal from the communication module 190 using the antenna element 311, the switch 531 may connect the antenna element 311 and a power amplifier 511. In the case where the electronic device 101 receives a signal to the communication module 190 using the antenna element 311, the switch 531 may connect the antenna element 311 and a low noise amplifier (LNA) 521.

Below, a path (hereinafter referred to as a "receive path") for receiving a signal to the communication module 190 will be described after a path (hereinafter referred to as a "transmit path") for transmitting a signal from the communication module 190 is described.

In an embodiment, the power amplifier 511, a first variable gain amplifier (VGA) 512 a phase shifter 513, a second VGA 514, a transmission splitter 515, and a mixer 516 may be positioned on the transmit path.

In an embodiment, the power amplifier 511 may amplifier a power of a transmit signal. The first VGA 512 and the second VGA 514 may perform a transmit auto gain control (AGC) operation under control of the communication module 190. The wireless communication circuit 330 may include at least one or more VGAs. The phase shifter 513 may shift a phase of a signal based on a beamforming angle under control of the communication module 190.

In an embodiment, the transmission splitter 515 may split a transmit signal provided from the mixer 516 into "n" signals. The mixer 516 may convert a Tx-IF (e.g., a transmit intermediate frequency) signal provided from a second circuit 530 into a transmit signal (e.g., an RF band or a millimeter wave band). The mixer 516 may receive a signal to be mixed from an oscillator outside or inside the wireless communication circuit 330.

In an embodiment, an LNA 521, a phase shifter 522, a first VGA 523, a combiner 524, a second VGA 525, and a mixer 526 may be positioned on the receive path.

The LNA 521 may amplify a signal received from the antenna element 311. The first VGA 523 and the second VGA 525 may perform a receive AGC operation under control of the communication module 190. The phase shifter 522 may shift a phase of a signal based on a beamforming angle under control of the communication module 190.

In an embodiment, the combiner 524 may combine signals that are aligned to the same phase through a phase shift operation. The combined signal may be provided to the mixer 526 through the second VGA 525. The mixer 526 may convert the received signal from an RF band into an IF band. The mixer 526 may receive a signal to be mixed from an oscillator outside or inside the wireless communication circuit 330.

In an embodiment, the conductive line 231 that selectively connects the transmit path or the receive path may be positioned in the rear of the mixer 516 in the wireless communication circuit 330. It may not be easy to connect the wireless communication circuit 330 and the communication module 190 with a transmission line when an intermediate frequency (IF) is high. In the case where the conductive line 231 selectively connects the transmit path or the receive path, the number of transmission lines between the wireless communication circuit 330 and the communication module 190 may decrease.

In an embodiment, a mixer 551, a third VGA 552, a low pass filter (LPF) 553, a fourth VGA 554, and a buffer 555 may be positioned on the transmit path in the communication module 190. The buffer 555 may function as a buffer upon receiving a balanced Tx signal from a transmit signal generator 556, thus making it possible to process the signal stably. The third VGA 552 and the fourth VGA 554 may perform the transmit AGC operation under control of the transmit signal generator 556. The LPF 553 may function as a noise filter by setting a bandwidth of a baseband transmit signal to a cutoff frequency. The cutoff frequency may be designated according to a transmit frequency that the communication module 190 uses. The mixer 551 may convert a balanced transmit signal into an inter frequency transmit (IF-Tx) signal.

In an embodiment, a mixer 561, a third VGA 562, an LPF 563, a fourth VGA 564, and a buffer 565 may be positioned on the receive path in the second circuit 530. The buffer 565 may function as a buffer upon providing a balanced Rx signal to a receive signal processor 566 from the fourth VGA 564, thus making it possible to process a signal stably. The third VGA 562 and the fourth VGA 564 may perform the receive AGC operation under control of the receive signal processor 566. The LPF 563 may function as a noise filter by setting a bandwidth of a baseband receive signal to a cutoff frequency. The cutoff frequency may be designated according to a receive frequency that the communication module 190 uses. The mixer 561 may convert an inter frequency receive (IF-Rx) signal into a balanced receive signal.

Figure 6:
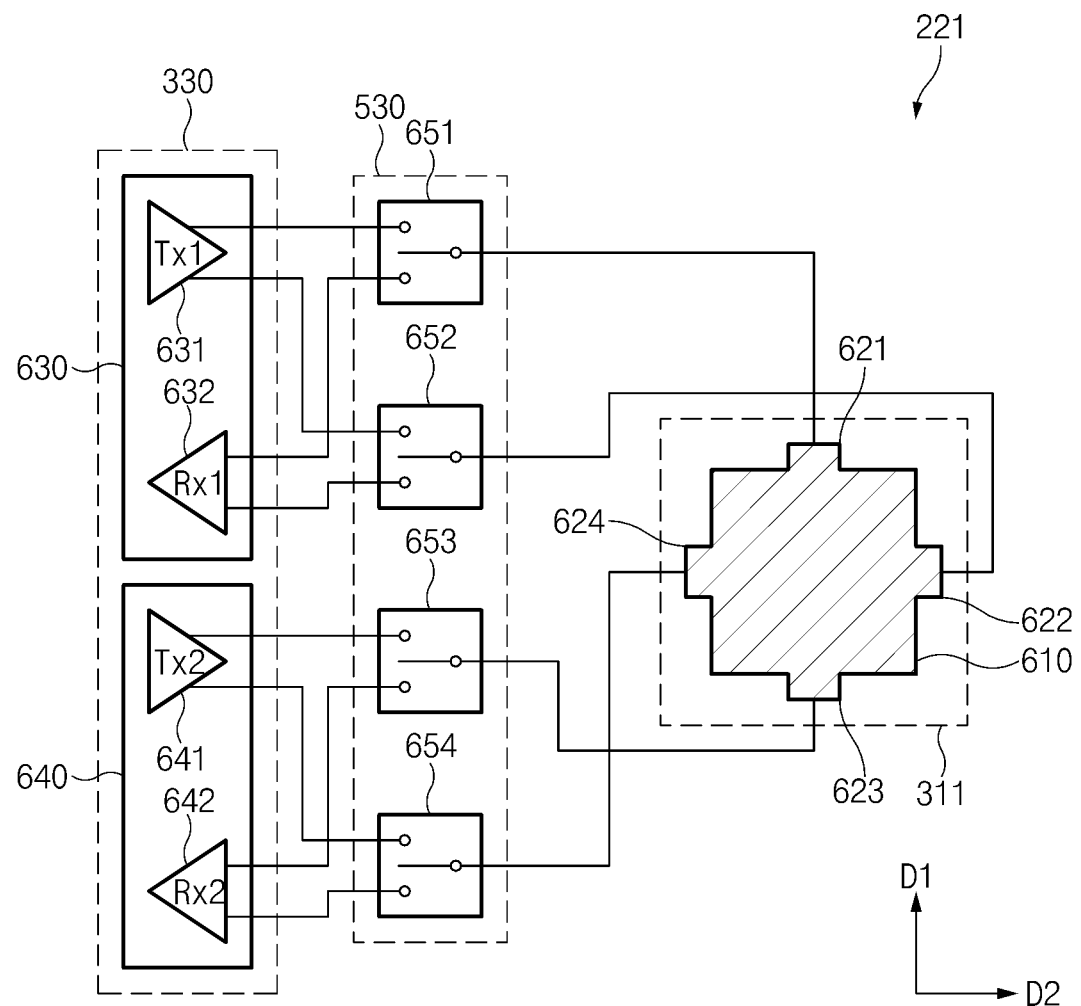
FIG. 6 is a diagram illustrating an example communication device according to an embodiment.

FIG. 6 is a block diagram illustrating an example communication device (e.g., the first communication device 221 of FIG. 2) according to an embodiment.

The communication device 221 according to an embodiment may include an antenna element (e.g., the antenna element 311 of FIG. 4), a wireless communication circuit (e.g., the wireless communication circuit 330 of FIG. 3 or the wireless communication circuit 330 of FIG. 5), and the switching unit (e.g., including at least one switch) 530. The one antenna element 311 included in the communication device 221 is illustrated in FIG. 6. However, the disclosure is not limited thereto. For example, the communication device 221 may include one or more antenna elements 311.

In an embodiment, the antenna element 311 may be provided with a transmit signal, which the wireless communication circuit 330 intends to transmit, through the switching unit 530 such that the transmit signal is emitted. The antenna element 311 may receive a signal around the electronic device 101 through the switching unit 530 so as to be provided to the wireless communication circuit 330. The antenna element 311 may include a radiation part (e.g., a radiator) 610, a first feeding port 621, a second feeding port 622, a third feeding port 623, and a fourth feeding port 624.

In an embodiment, the radiation part 610 may be provided with a transmit signal from the wireless communication circuit 330. The radiation part 610 may emit the provided transmit signal. The radiation part 610 may receive a signal around the electronic device 101 through the first to fourth feeding ports 621 to 624. The radiation part 610 may transfer the received signal (e.g., a receive signal) to the wireless communication circuit 330 through the first to fourth feeding ports 621 to 624.

In an embodiment, the first to fourth feeding ports 621 to 624 may supply a power to the antenna element 311. The first to fourth feeding ports 621 to 624 may receive a signal around the electronic device 101. The first to fourth feeding ports 621 to 624 may supply a power to the radiation part 610 connected with the first to fourth feeding ports 621 to 624 using the receive signal.

In an embodiment, the first to fourth feeding ports 621 to 624 may be formed on one side of the radiation part 610. The first to fourth feeding ports 621 to 624 may be extended from at least a portion of one side of the radiation part 610.

In an embodiment, the first feeding port 621 may be formed in a first direction D1 from the radiation part 610. The first direction D1 may be a direction that is parallel to a Y-axis of FIG. 4. In the case where the radiation part 610 is a quadrilateral patch, the first feeding port 621 may protrude from at least a portion (e.g., a center portion of an edge) of an edge positioned in the first direction D1 from among four edges of the radiation part 610.

In an embodiment, the second feeding port 622 may be formed in a second direction D2 from the radiation part 610. The second direction D2 may be a direction that is parallel to an X-axis of FIG. 4. The second direction D2 may be a direction perpendicular to the first direction D1. In the case where the radiation part 610 is a quadrilateral patch, the second feeding port 622 may protrude from at least a portion (e.g., a center portion of an edge) of an edge positioned in the second direction D2 from among the four edges of the radiation part 610.

In an embodiment, the third feeding port 623 may be formed in a direction facing away from the first direction D1 of the radiation part 610. In the case where the radiation part 610 is a quadrilateral patch, the third feeding port 623 may protrude from at least a portion (e.g., a center portion of an edge) of an edge of the radiation part 610, which is positioned in the direction facing away from the first direction D1. The third feeding port 623 may be formed to be symmetrical to the first feeding port 621 with respect to the radiation part 610.

In an embodiment, the fourth feeding port 624 may be formed in a direction facing away from the second direction D2 of the radiation part 610. In the case where the radiation part 610 is a quadrilateral patch, the fourth feeding port 624 may protrude from at least a portion (e.g., a center portion of an edge) of an edge of the radiation part 610, which is positioned in a direction facing away from the second direction D2. The fourth feeding port 624 may be formed to be symmetrical to the second feeding port 622 with respect to the radiation part 610.

In an embodiment, the wireless communication circuit 330 may generate a transmit signal of the electronic device 101. The wireless communication circuit 330 may provide a transmit signal to the antenna element 311 through the switching unit 530. The wireless communication circuit 330 may be provided with a signal, which the antenna element 311 receives, through the switching unit 530. The wireless communication circuit 330 may include a first communication circuit 630 (e.g., an RF chain) and a second communication circuit 640. However, the disclosure is not limited thereto. For example, the wireless communication circuit 330 may include at least one communication circuit 630 or 640.

In an embodiment, the first communication circuit 630 may perform wireless communication based on a specified frequency. The first communication circuit 630 may include a first transmitter (Tx1) 631 and a first receiver (Rx1) 632.

In an embodiment, the first transmitter 631 may provide a transmit signal to the antenna element 311 through the switching unit 530. The first transmitter 631 may be configured to use the specified frequency.

In an embodiment, the first receiver 632 may be provided with a received signal from the antenna element 311 through the switching unit 530. The first receiver 632 may be configured to use the specified frequency.

In an embodiment, the second communication circuit 640 may perform wireless communication based on the specified frequency. The second communication circuit 640 may include a second transmitter (Tx2) 641 and a second receiver (Rx2) 642.

In an embodiment, the second transmitter 641 may provide a transmit signal to the antenna element 311 through the switching unit 530. The second transmitter 641 may be configured to use the specified frequency.

In an embodiment, the second receiver 642 may be provided with a received signal from the antenna element 311 through the switching unit 530. The second receiver 642 may be configured to use the specified frequency.

In an embodiment, the switching unit 530 may connect the antenna element 311 and the wireless communication circuit 330. The switching unit 530 may be adapted to selectively connect the first to fourth feeding ports 621 to 624 and the first and second communication circuits 630 and 640. The switching unit 530 may include first to fourth switches 651 to 654.

In an embodiment, the first switch 651 may be adapted to selectively connect the first transmitter 631 and the first receiver 632 with the first feeding port 621. The first switch 651 may connect the first transmitter 631 and the first feeding port 621 such that a transmit signal is provided from the first transmitter 631 to the first feeding port 621. The first switch 651 may connect the first receiver 632 and the first feeding port 621 such that a receive signal is provided from the first feeding port 621 to the first receiver 632.

In an embodiment, the second switch 652 may be adapted to selectively connect the first transmitter 631 and the first receiver 632 with the second feeding port 622. The second switch 652 may connect the first transmitter 631 and the second feeding port 622 such that a transmit signal is provided from the first transmitter 631 to the second feeding port 622. The second switch 652 may connect the first receiver 632 and the second feeding port 622 such that a receive signal is provided from the second feeding port 622 to the first receiver 632.

In an embodiment, the third switch 653 may be adapted to selectively connect the second transmitter 641 and the second receiver 642 with the third feeding port 623. The third switch 653 may connect the second transmitter 641 and the third feeding port 623 such that a transmit signal is provided from the second transmitter 641 to the third feeding port 623. The third switch 653 may connect the second receiver 642 and the third feeding port 623 such that a receive signal is provided from the third feeding port 623 to the second receiver 642.

In an embodiment, the fourth switch 654 may be adapted to selectively connect the second transmitter 641 and the second receiver 642 with the fourth feeding port 624. The fourth switch 654 may connect the second transmitter 641 and the fourth feeding port 624 such that a transmit signal is provided from the second transmitter 641 to the fourth feeding port 624. The fourth switch 654 may connect the second receiver 642 and the fourth feeding port 624 such that a receive signal is provided from the fourth feeding port 624 to the second receiver 642.

FIGS. 7A, 7B, 7C and 7D are diagrams illustrating example paths connecting the antenna element 311 and the wireless communication circuit 330 in the communication device 221, according to an embodiment.

In an embodiment, the communication device 221 may connect the radiation part 610 of the antenna element 311 with the first transmitter 631, the first receiver 632, the second transmitter 641, and the second receiver 642 of the wireless communication circuit 330 using a plurality of paths. The plurality of paths may be formed between the first to fourth feeding ports 621 to 624 of the antenna element 311 and the first transmitter 631, the first receiver 632, the second transmitter 641, and the second receiver 642 of the wireless communication circuit 330.

In an embodiment, the plurality of paths may be formed using a first double pole double throw (DPDT) switch 710 and a second DPDT switch 720. The first DPDT switch 710 may perform the same function as a combination of the first switch 651 and the second switch 652. For example, the first switch 651 and the second switch 652 may constitute the first DPDT switch 710. The second DPDT switch 720 may perform the same function as a combination of the third switch 653 and the fourth switch 654. For example, the third switch 653 and the fourth switch 654 may constitute the second DPDT switch 720.

In an embodiment, the first DPDT switch 710 and the second DPDT switch 720 may be formed with one semiconductor package. The first DPDT switch 710 and the second DPDT switch 720 may be mounted on one RFIC.

In an embodiment, the first feeding port 621 and the third feeding port 623 may be symmetrical in the first direction D1 with respect to the radiation part 610. The first feeding port 621 and the third feeding port 623 may transmit/receive a horizontally polarized (H Pol.) signal. The second feeding port 622 and the fourth feeding port 624 may be symmetrical in the second direction D2 with respect to the radiation part 610. The second feeding port 622 and the fourth feeding port 624 may transmit/receive a vertically polarized (V Pol.) signal.

In an embodiment, the electronic device 101 may further include a control circuit that identifies a communication state associated with the wireless communication circuit 330. The control circuit may be included in the communication module 190 (e.g., an RFIC, a BP, a CP, or a modem) connected with the wireless communication circuit 330.

In an embodiment, the control circuit may connect the first receiver 632 to the first feeding port 621 at least temporarily through the first switch 651. The control circuit may be configured to measure strength of a signal that is received by the first receiver 632. The control circuit may be configured to identify receive sensitivity of the first communication circuit 630 in the first direction D1 as at least a portion of a communication state.

In an embodiment, the control circuit may connect the first receiver 632 to the second feeding port 622 at least temporarily through the second switch 652. The control circuit may be configured to measure strength of a signal that is received by the first receiver 632. The control circuit may be configured to identify receive sensitivity of the first communication circuit 630 in the second direction D2 as at least a portion of a communication state.

In an embodiment, the control circuit may connect the second receiver 642 to the third feeding port 623 at least temporarily through the third switch 653. The control circuit may be configured to measure strength of a signal that is received by the second receiver 642. The control circuit may be configured to identify receive sensitivity of the second communication circuit 640 in the first direction D1 as at least a portion of a communication state.

In an embodiment, the control circuit may connect the second receiver 642 to the fourth feeding port 624 at least temporarily through the fourth switch 654. The control circuit may be configured to measure strength of a signal that is received by the second receiver 642. The control circuit may be configured to identify receive sensitivity of the second communication circuit 640 in the second direction D2 as at least a portion of a communication state.

In an embodiment, the communication device 221 may use feeding ports, which are formed in a direction parallel to a direction in which receive sensitivity of a signal is greater than specified sensitivity, from among the first to fourth feeding ports 621 to 624. The communication device 221 may establish paths connecting the antenna element 311 and the wireless communication circuit 330 using feeding ports, which are formed in a direction in which a communication state is good, from among the first to fourth feeding ports 621 to 624.

Figure 7A:
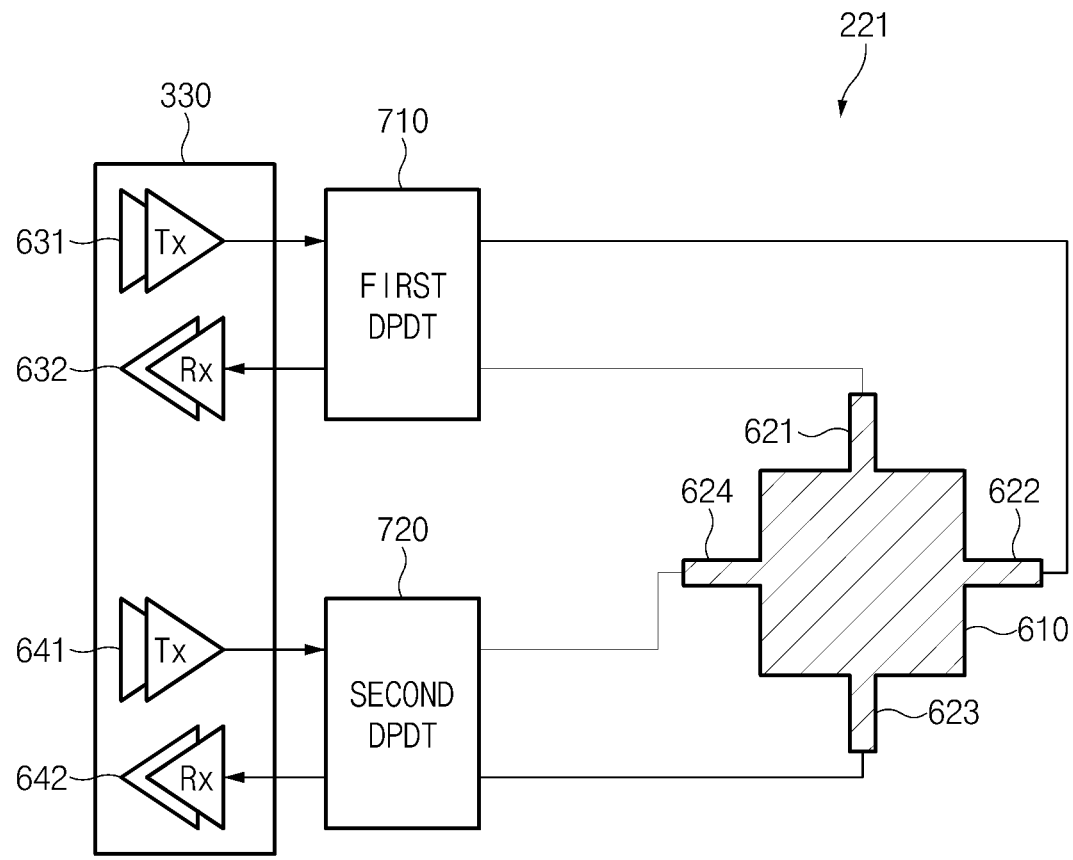
FIGS. 7A, 7B, 7C and 7D are diagrams illustrating example paths connecting an antenna element and a wireless communication circuit in an example communication device according to an embodiment.

In an embodiment, the communication device 221 may be used in an environment where receive sensitivity of a horizontally polarized signal and a vertically polarized signal is not smaller than specified receive sensitivity, as illustrated in FIG. 7A. The electronic device 101 (e.g., the communication module 190) may measure receive sensitivity of a horizontally polarized signal and a vertically polarized signal. In the case where the receive sensitivity of both the horizontally polarized signal and the vertically polarized signal is greater than the specified receive sensitivity, the communication module 190 may determine that communication states of the first to fourth feeding ports 621 to 624 formed in the first direction D1, the second direction D2, a direction facing away the first direction D1, and a direction facing away the second direction D2 satisfy a specified condition.

In an embodiment, the communication device 221 may disconnect the first feeding port 621 from the first transmitter 631 using the first DPDT switch 710. The communication device 221 may disconnect the first feeding port 621 from the first receiver 632 using the first DPDT switch 710.

In an embodiment, the communication device 221 may connect the second feeding port 622 and the first transmitter 631 using the first DPDT switch 710. The communication device 221 may connect the second feeding port 622 and the first receiver 632 using the first DPDT switch 710.

In an embodiment, the communication device 221 may connect the third feeding port 623 and the second transmitter 641 using the second DPDT switch 720. The communication device 221 may connect the third feeding port 623 and the second receiver 642 using the second DPDT switch 720.

In an embodiment, the communication device 221 may disconnect the fourth feeding port 624 from the second transmitter 641 using the second DPDT switch 720. The communication device 221 may disconnect the fourth feeding port 624 from the second receiver 642 using the second DPDT switch 720.

In an embodiment, the electronic device 101 that includes the communication device 221 may establish paths connecting the antenna element 311 and the wireless communication circuit 330 by selectively using the feeding ports 621 to 624 that provide a communication state satisfying a specified condition. The case where the communication device 221 uses the second and third feeding ports 622 and 623 is illustrated in FIG. 7A. However, the disclosure is not limited thereto. For example, the communication device 221 may use any one feeding port of the first and third feeding ports 621 and 623 that protrude in a direction parallel to the first direction D1 and any one feeding port of the second and fourth feeding ports 622 and 624 that protrude in a direction parallel to the second direction D2.

Figure 7B:
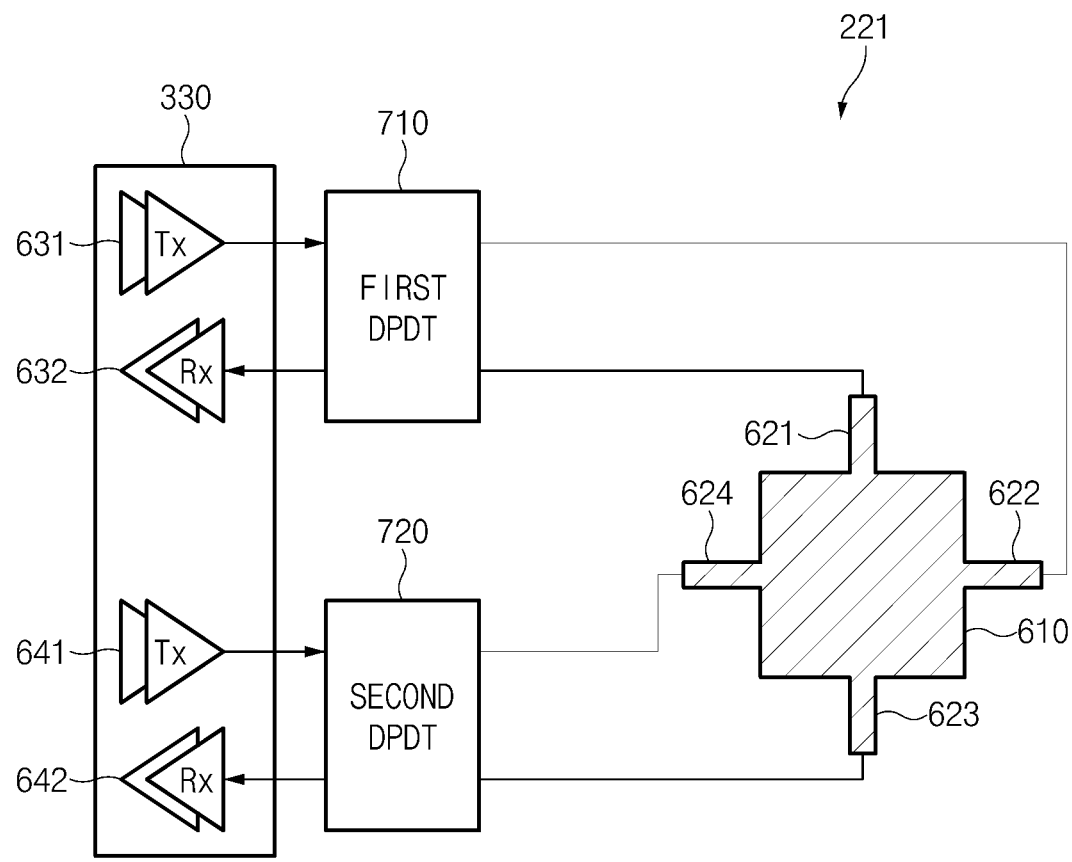

In an embodiment, the communication device 221 may be used in an environment where receive sensitivity of a horizontally polarized signal is not smaller than specified receive sensitivity, as illustrated in FIG. 7B. The electronic device 101 (e.g., the communication module 190) may measure receive sensitivity of a horizontally polarized signal and a vertically polarized signal. In the case where the receive sensitivity of the vertically polarized signal is smaller than the specified receive sensitivity and the receive sensitivity of the horizontally polarized signal is greater than the specified receive sensitivity, the communication module 190 may determine that a communication state of the first and third feeding ports 621 and 623 formed in the first direction D1 satisfies a specified condition.

In an embodiment, the communication device 221 may connect the first feeding port 621 and the first transmitter 631 using the first DPDT switch 710. The communication device 221 may connect the first feeding port 621 and the first receiver 632 using the first DPDT switch 710.

In an embodiment, the communication device 221 may disconnect the second feeding port 622 from the first transmitter 631 using the first DPDT switch 710. The communication device 221 may disconnect the second feeding port 622 from the first receiver 632 using the first DPDT switch 710.

In an embodiment, the communication device 221 may connect the third feeding port 623 and the second transmitter 641 using the second DPDT switch 720. The communication device 221 may connect the third feeding port 623 and the second receiver 642 using the second DPDT switch 720.

In an embodiment, the communication device 221 may disconnect the fourth feeding port 624 from the second transmitter 641 using the second DPDT switch 720. The communication device 221 may disconnect the fourth feeding port 624 from the second receiver 642 using the second DPDT switch 720.

In an embodiment, the communication device 221 may establish paths connecting the antenna element 311 and the wireless communication circuit 330 using the first and third feeding ports 621 and 623 that provide a communication state satisfying the specified condition. The communication device 221 may connect the antenna element 311 and the wireless communication circuit 330 using all the first and third feeding ports 621 and 623 that are symmetrical with respect to the radiation part 610.

In an embodiment, even in the case where the receive sensitivity of the vertically polarized signal is smaller than the specified receive sensitivity, the electronic device 101 that includes the communication device 221 may connect the antenna element 311 and the wireless communication circuit 330 using paths, the number of which is the same as the number of paths corresponding to the environment where the receive sensitivity of the vertically polarized signal and the horizontally polarized signal is not smaller than the specified receive sensitivity. The electronic device 101 that includes the communication device 221 may connect the first and third feeding ports 621 and 623, which are arranged to be symmetrical in the first direction D1 with respect to the radiation part 610, with both the first communication circuit 630 and the second communication circuit 640 using the first DPDT switch 710 and the second DPDT switch 720.

In an embodiment, in the case where the electronic device 101 transmits a signal from the wireless communication circuit 330 using the antenna element 311, the first DPDT switch 710 and the second DPDT switch 720 may connect both the first transmitter 631 and the second transmitter 641 with the first and third feeding ports 621 and 623 where receive sensitivity of a signal is not smaller than the specified receive sensitivity. In the case where the electronic device 101 receives a signal to the wireless communication circuit 330 using the antenna element 311, the first DPDT switch 710 and the second DPDT switch 720 may connect both the first receiver 632 and the second receiver 642 with the first and third feeding ports 621 and 623 where receive sensitivity of a signal is not smaller than the specified receive sensitivity.

Figure 7C:
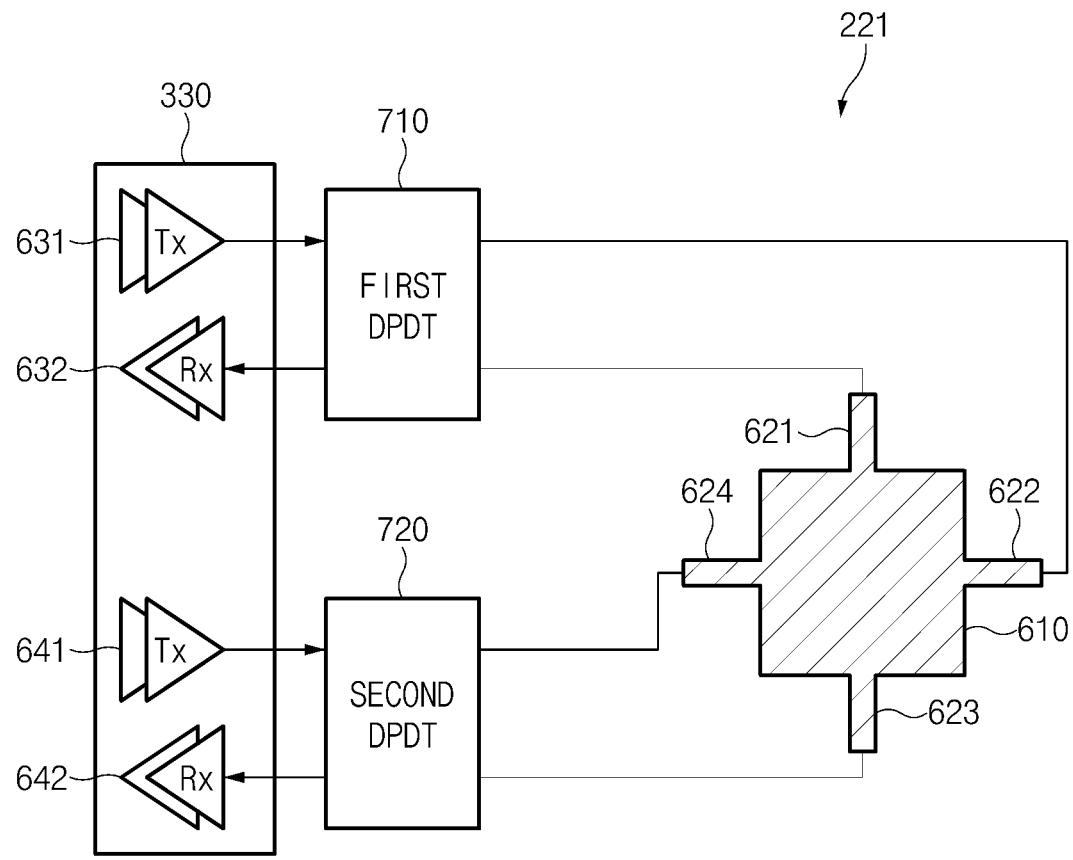

In an embodiment, the communication device 221 may be used in an environment where receive sensitivity of a vertically polarized signal is not smaller than specified receive sensitivity, as illustrated in FIG. 7C. The electronic device 101 (e.g., the communication module 190) may measure receive sensitivity of a horizontally polarized signal and a vertically polarized signal. In the case where the receive sensitivity of the horizontally polarized signal is smaller than the specified receive sensitivity and the receive sensitivity of the vertically polarized signal is greater than the specified receive sensitivity, the communication module 190 may determine that a communication state of the second and fourth feeding ports 622 and 624 formed in the second direction D2 satisfies a specified condition.

In an embodiment, the communication device 221 may disconnect the first feeding port 621 from the first transmitter 631 using the first DPDT switch 710. The communication device 221 may disconnect the first feeding port 621 from the first receiver 632 using the first DPDT switch 710.

In an embodiment, the communication device 221 may connect the second feeding port 622 and the first transmitter 631 using the first DPDT switch 710. The communication device 221 may connect the second feeding port 622 and the first receiver 632 using the first DPDT switch 710.

In an embodiment, the communication device 221 may disconnect the third feeding port 623 from the second transmitter 641 using the second DPDT switch 720. The communication device 221 may disconnect the third feeding port 623 from the second receiver 642 using the second DPDT switch 720.

In an embodiment, the communication device 221 may connect the fourth feeding port 624 and the second transmitter 641 using the second DPDT switch 720. The communication device 221 may connect the fourth feeding port 624 and the second receiver 642 using the second DPDT switch 720.

In an embodiment, the communication device 221 may establish paths connecting the antenna element 311 and the wireless communication circuit 330 using the second and fourth feeding ports 622 and 624 that provide a communication state satisfying the specified condition. The communication device 221 may connect the antenna element 311 and the wireless communication circuit 330 using all the second and fourth feeding ports 622 and 624 that are symmetrical with respect to the radiation part 610.

In an embodiment, even in the case where the receive sensitivity of the horizontally polarized signal is smaller than the specified receive sensitivity, the electronic device 101 that includes the communication device 221 may connect the antenna element 311 and the wireless communication circuit 330 using paths, the number of which is the same as the number of paths corresponding to the environment where the receive sensitivity of the vertically polarized signal and the horizontally polarized signal is not smaller than the specified receive sensitivity. The electronic device 101 that includes the communication device 221 may connect the second and fourth feeding ports 622 and 624, which are arranged to be symmetrical in the second direction D2 with respect to the radiation part 610, with both the first communication circuit 630 and the second communication circuit 640 using the first DPDT switch 710 and the second DPDT switch 720.

In an embodiment, in the case where the electronic device 101 transmits a signal from the wireless communication circuit 330 using the antenna element 311, the first DPDT switch 710 and the second DPDT switch 720 may connect both the first transmitter 631 and the second transmitter 641 with the second and fourth feeding ports 622 and 624 where receive sensitivity of a signal is not smaller than the specified receive sensitivity. In the case where the electronic device 101 receives a signal to the wireless communication circuit 330 using the antenna element 311, the first DPDT switch 710 and the second DPDT switch 720 may connect both the first receiver 632 and the second receiver 642 with the second and fourth feeding ports 622 and 624 where receive sensitivity of a signal is not smaller than the specified receive sensitivity.

Figure 7D:
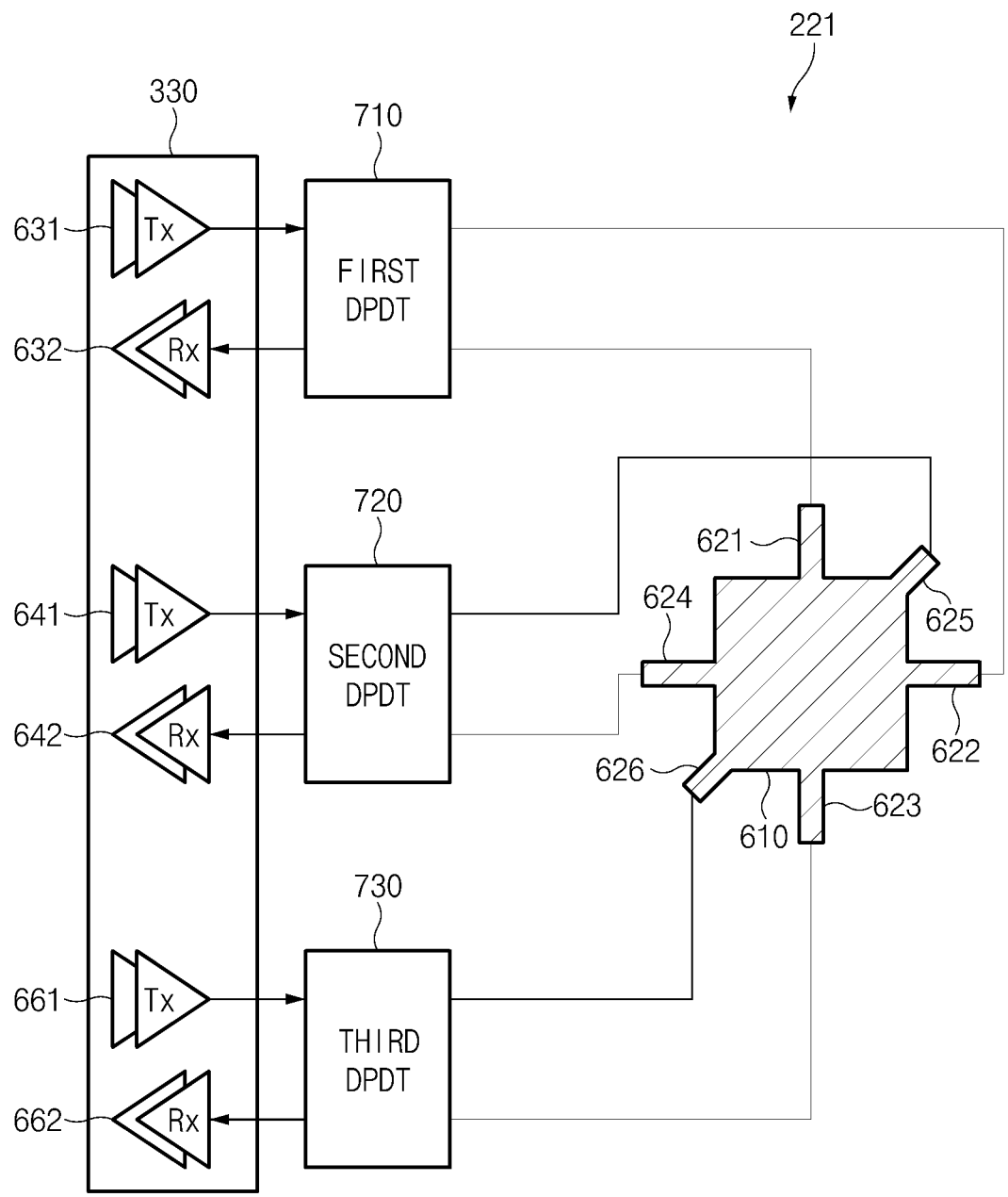

In an embodiment, the communication device 221 may be used in an environment where a signal is polarized at a specified angle, as illustrated in FIG. 7D. The radiation part 610 of the communication device 221 may further include fifth and sixth feeding ports 625 and 626 that are formed in a third direction D3 different from the first direction D1 and the second direction D2. The communication device 221 may further include a third communication circuit including a third transmitter 661 and a third receiver 662, and a third DPDT switch 730. The electronic device 101 (e.g., the communication module 190) may measure receive sensitivity of a signal polarized in the third direction D3. In the case where the receive sensitivity of the signal polarized in the third direction D3 is greater than the specified receive sensitivity, the communication module 190 may determine that communication states of the fifth and sixth feeding ports 625 and 626 satisfy a specified condition.

In an embodiment, the communication device 221 may disconnect the first feeding port 621 from the first transmitter 631 using the first DPDT switch 710. The communication device 221 may disconnect the first feeding port 621 from the first receiver 632 using the first DPDT switch 710.

In an embodiment, the communication device 221 may disconnect the second feeding port 622 from the first transmitter 631 using the first DPDT switch 710. The communication device 221 may disconnect the second feeding port 622 from the first receiver 632 using the first DPDT switch 710.

In an embodiment, the communication device 221 may disconnect the fourth feeding port 624 from the second transmitter 641 using the second DPDT switch 720. The communication device 221 may disconnect the fourth feeding port 624 from the second receiver 642 using the second DPDT switch 720.

In an embodiment, the communication device 221 may connect the fifth feeding port 625 and the second transmitter 641 using the second DPDT switch 720. The communication device 221 may connect the fifth feeding port 625 and the second receiver 642 using the second DPDT switch 720.

In an embodiment, the communication device 221 may disconnect the third feeding port 623 from the third transmitter 661 using the third DPDT switch 730. The communication device 221 may disconnect the third feeding port 623 from the third receiver 662 using the third DPDT switch 730.

In an embodiment, the communication device 221 may connect the sixth feeding port 626 and the third transmitter 661 using the third DPDT switch 730. The communication device 221 may connect the sixth feeding port 626 and the third receiver 662 using the third DPDT switch 730.

In an embodiment, the communication device 221 may establish paths connecting the antenna element 311 and the wireless communication circuit 330 using the fifth and sixth feeding ports 625 and 626 that provide a communication state satisfying the specified condition. The communication device 221 may connect the antenna element 311 and the wireless communication circuit 330 using all the fifth and sixth feeding ports 625 and 626 that are symmetrical with respect to the radiation part 610.

In an embodiment, even in the case where receive sensitivity at an angle except for the specified angle is smaller than the specified receive sensitivity, the electronic device 101 that includes the communication device 221 may connect the antenna element 311 and the wireless communication circuit 330 without decreasing the number of paths. The electronic device 101 that includes the communication device 221 may connect the fifth and sixth feeding ports 625 and 626, which are arranged to be symmetrical in the third direction D3 with respect to the radiation part 610, with both the second communication circuit and the third communication circuit using the second DPDT switch 720 and the third DPDT switch 730.

In an embodiment, in the case where the electronic device 101 transmits a signal from the wireless communication circuit 330 using the antenna element 311, the second DPDT switch 720 and the third DPDT switch 730 may connect both the second transmitter 641 and the third transmitter 661 with the fifth and sixth feeding ports 625 and 626 where receive sensitivity of a signal is not smaller than the specified receive sensitivity. In the case where the electronic device 101 receives a signal to the wireless communication circuit 330 using the antenna element 311, the second DPDT switch 720 and the third DPDT switch 730 may connect both the second receiver 642 and the third receiver 662 with the fifth and sixth feeding ports 625 and 626 where receive sensitivity of a signal is not smaller than the specified receive sensitivity.

Figure 8:
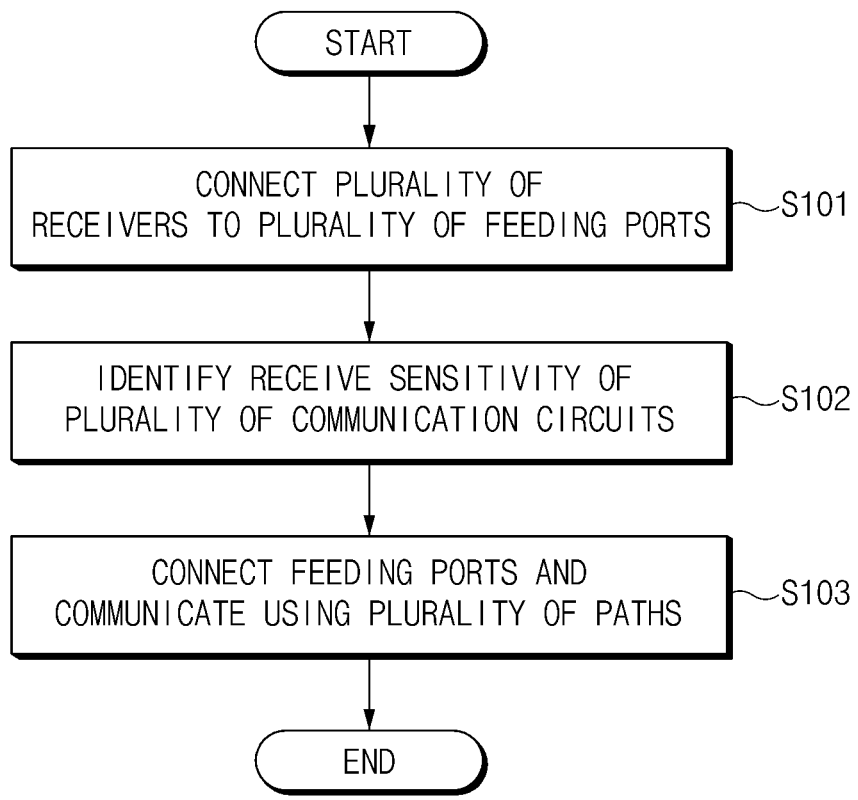
FIGS. 8 and 9 are flowcharts illustrating an example control method of an electronic device according to an embodiment.

FIG. 8 is a flowchart illustrating an example control method of the electronic device 101 according to an embodiment. The electronic device 101 may establish or use paths between the antenna element 311 and the wireless communication circuit 330 in a control manner illustrated in FIG. 8.

In operation S101, the electronic device 101 (e.g., the communication module 190) according to an embodiment may connect the plurality of feeding ports 621 to 624 with the plurality of receivers 632 and 642 through the switching unit 530. The electronic device 101 may connect the plurality of receivers 632 and 642 at least temporarily to the plurality of feeding ports 621 to 624 using the control circuit.

In operation S102, the electronic device 101 (e.g., the communication module 190) according to an embodiment may identify receive sensitivity of each of the plurality of communication circuits 630 and 640. For example, the electronic device 101 may compare sensitivity of a signal coming through the first and third feeding ports 621 and 623 of the antenna element 311 with sensitivity of a signal coming through the second and fourth feeding ports 622 and 624. For example, the control circuit of the electronic device 101 may calculate a sum of signals coming through the first and third feeding ports 621 and 623 as a first reference signals received power (RSRP) value. The control circuit of the electronic device 101 may calculate a sum of signals coming through the second and fourth feeding ports 622 and 624 as a second RSRP value.

In operation S103, the electronic device 101 (e.g., the communication module 190) according to an embodiment may connect feeding ports having receive sensitivity satisfying a specified condition and may perform communication using a plurality of paths. The electronic device 101 may connect the plurality of transmitters 631 and 641 or the plurality of receivers 632 and 642 to the plurality of feeding ports 621 to 624 through the plurality of paths. The plurality of paths may be selectively formed or used by the switching unit 530.

In an embodiment, the control circuit of the electronic device 101 may be configured to use feeding ports having receive sensitivity satisfying the specified condition when the plurality of paths are formed. For example, when the first RSRP value is greater than the second RSRP value, the electronic device 101 may establish the plurality of paths using the first and third feeding ports 621 and 623. For another example, when the second RSRP value is greater than the first RSRP value, the electronic device 101 may establish the plurality of paths using the second and fourth feeding ports 622 and 624.

In an embodiment, the switching unit 530 of the electronic device 101 may include a DPDT switch and may be designed to implement a dual feeding network of the antenna element 311. The switching unit 530 including the DPDP switch may include a plurality of paths, each of the plurality of paths having waves polarized in the first or second direction D1 or D2 from the plurality of feeding ports 621 to 624, respectively. Afterwards, a path, which corresponds to a direction where receive sensitivity satisfies the specified condition, from among the plurality of paths may be used.

In an embodiment, the electronic device 101 may set the plurality of paths so as to detect any one of vertical polarization or horizontal polarization. For example, in the case where the antenna element 311 of the electronic device 101 includes the first to fourth feeding ports 621 to 624, the electronic device 101 may include two paths for detecting a vertically polarized signal and two paths for detecting a horizontally polarized signal.

In an embodiment, when the electronic device 101 uses feeding ports having receive sensitivity satisfying the specified condition, the electronic device 101 may implement a dual feeding network using feeding ports that are symmetrical with respect to the radiation part 610 and have a phase difference of 180 degrees. For example, the electronic device 101 may supply a power using the first and third feeding ports 621 and 623 that are symmetrical in the first direction D1 with respect to the radiation part 610. For another example, the electronic device 101 may supply a power using the second and fourth feeding ports 622 and 624 that are symmetrical in the second direction D2 with respect to the radiation part 610. In the case where the electronic device 101 performs dual feeding using two feeding ports that are symmetrical with respect to the radiation part 610, a magnitude of a signal that is transmitted from the wireless communication circuit 330 or is received to the wireless communication circuit 330 may be increased as much as twice, and thus, a gain of 3 dB may be obtained.

Figure 9:
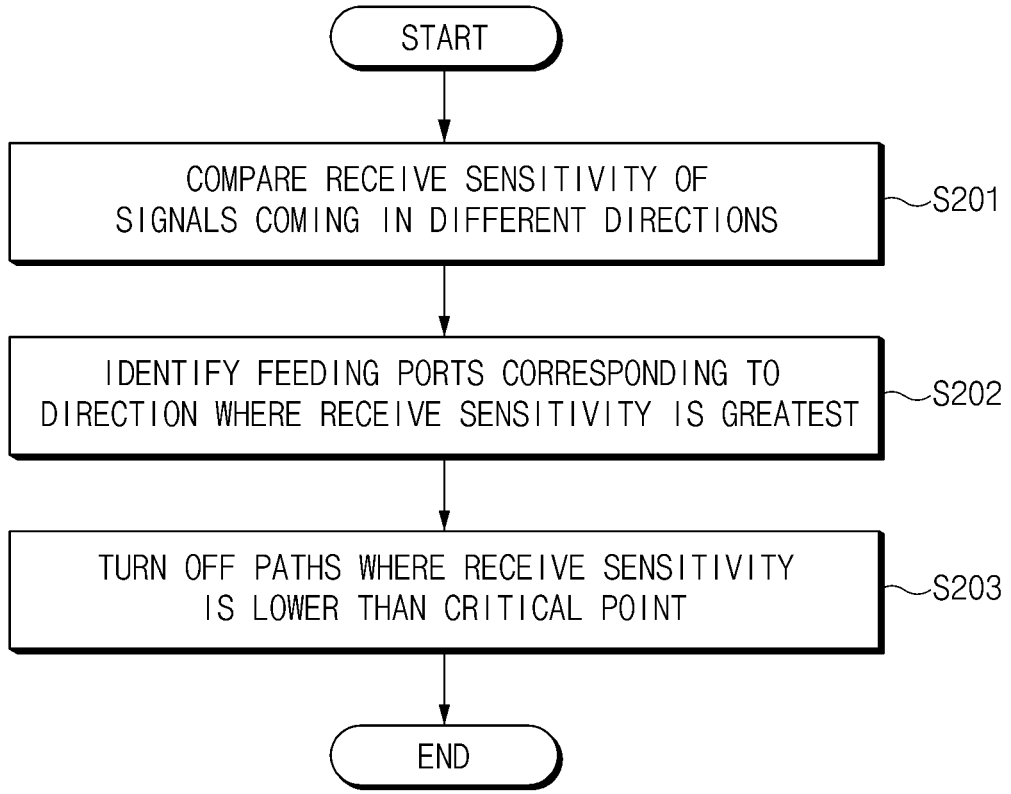

FIG. 9 is a flowchart illustrating an example control method of the electronic device 101 according to an embodiment. The electronic device 101 may select paths between the antenna element 311 and the wireless communication circuit 330 in a control manner illustrated in FIG. 9.

In operation S201, the electronic device 101 (e.g., the communication module 190) according to an embodiment may compare receive sensitivity of signals coming in different directions. For example, the electronic device 101 may compare receive sensitivity of signals coming in the first and second directions D1 and D2 that are perpendicular to each other. The electronic device 101 may measure receive sensitivity of signals coming in the first and second directions D1 and D2 using the plurality of feeding ports 621 to 624 positioned in the first direction D1, the second direction D2, a direction facing away the first direction D1, and a direction facing away the second direction D2 with respect to the radiation part 610. The electronic device 101 may connect the plurality of receivers 632 and 642 at least temporarily to the plurality of feeding ports 621 to 624 using the control circuit. The control circuit may measure strength of a signal received from each of the plurality of feeding ports 621 to 624.

In operation S202, the electronic device 101 (e.g., the communication module 190) according to an embodiment may identify feeding ports corresponding to a direction where receive sensitivity is the greatest. For example, the electronic device 101 may identify feeding ports corresponding to a direction, in which receive sensitivity is the greatest, from among the first direction D1 or the second direction D2. Based on the measured receive sensitivity, the control circuit may select feeding ports, at which receive sensitivity is the greatest, from among the first and third feeding ports 621 and 623, each formed in the first direction D1 and the direction facing away the first direction D1 at the radiation part 610 and the second and fourth feeding ports 622 and 624, each formed in the second direction D2 and the direction facing away the second direction D2 at the radiation part 610.

In operation S203, the electronic device 101 (e.g., the communication module 190) according to an embodiment may turn off paths, in which receive sensitivity is lower than a critical point, from among paths connected with the wireless communication circuit 330. The electronic device 101 may use paths, which are connected with feeding ports corresponding to a direction where receive sensitivity is the greatest, from among a plurality of paths. The remaining paths except for paths that the electronic device 101 uses may not be established such that a signal is prevented from being transmitted and received. Because the electronic device 101 does not use a feeding port corresponding to a direction where receive sensitivity is low, there may be prevented unnecessary power consumption due to the use of the feeding port corresponding to the direction where the receive sensitivity is low.

Figure 10:
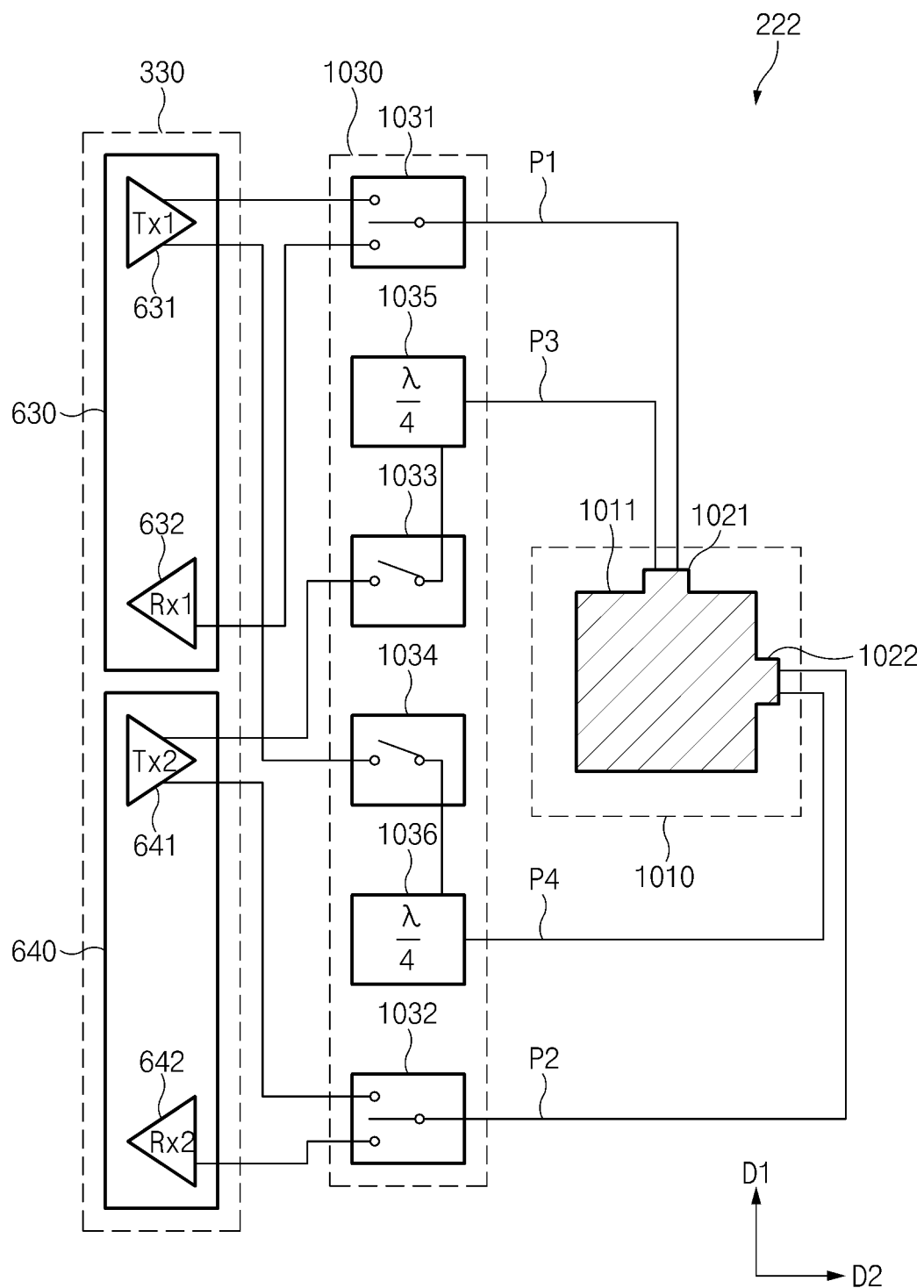
FIG. 10 is a diagram illustrating an example communication device according to another embodiment.

FIG. 10 is a diagram illustrating an example communication device (e.g., the second communication device 222 of FIG. 2) according to another embodiment.

The communication device 222 may include an antenna element 1010, the wireless communication circuit 330, and a switching unit (e.g., including a switch) 1030. With regard to the antenna element 1010, the wireless communication circuit 330, and the switching unit 1030 of the communication device 222 according to another embodiment, additional description of functions and roles that are the same as those of the antenna element 311, the wireless communication circuit 330, and the switching unit 530 of the communication device 221 according to an embodiment will not be repeated here to avoid redundancy.

According to an embodiment, the antenna element 1010 may include a radiation part (e.g., a radiator) 1011, a first feeding port 1021, and a second feeding port 1022.

In an embodiment, the radiation part 1011 may receive a signal around the electronic device 101 through the first and second feeding ports 1021 and 1022. The radiation part 1011 may transfer receive signals received through the first and second feeding ports 1021 and 1022 to the wireless communication circuit 330.

In an embodiment, the radiation part 1011 may be in the form of a patch. For example, the radiation part 1011 may be in the form of a quadrilateral or a circle.

In an embodiment, the first and second feeding ports 1021 and 1022 may supply a power to the antenna element 1010.

In an embodiment, the first feeding port 1021 may be formed in the first direction D1 of the radiation part 1011. In the case where the radiation part 1011 is in the form of a quadrilateral patch, the first feeding port 1021 may protrude from at least a portion (e.g., a center portion of an edge) of an edge positioned in the first direction D1 from among four edges of the radiation part 1011.

In an embodiment, the second feeding port 1022 may be formed in the second direction D2 of the radiation part 1011. In the case where the radiation part 1011 is in the form of a quadrilateral patch, the second feeding port 1022 may protrude from at least a portion (e.g., a center portion of an edge) of an edge positioned in the second direction D2 from among the four edges of the radiation part 1011.

In an embodiment, the wireless communication circuit 330 may include the first communication circuit 630 (e.g., an RF chain) and the second communication circuit 640. However, the disclosure is not limited thereto. For example, the wireless communication circuit 330 may include at least one communication circuit 630 or 640.

In an embodiment, the first communication circuit 630 may perform wireless communication based on the specified frequency. The first communication circuit 630 may include the first transmitter (Tx1) 631 and the first receiver (Rx1) 632.

In an embodiment, the first transmitter 631 may provide a transmit signal to the antenna element 1010 through the switching unit 1030. The first transmitter 631 may be configured to use the specified frequency.

In an embodiment, the first receiver 632 may be provided with a received signal from the antenna element 1010 through the switching unit 1030. The first receiver 632 may be configured to use the specified frequency.

In an embodiment, the second communication circuit 640 may perform wireless communication based on the specified frequency. The second communication circuit 640 may include the second transmitter (Tx2) 641 and the second receiver (Rx2) 642.

In an embodiment, the second transmitter 641 may provide a transmit signal to the antenna element 1010 through the switching unit 1030. The second transmitter 641 may be configured to use the specified frequency.

In an embodiment, the second receiver 642 may be provided with a received signal from the antenna element 1010 through the switching unit 1030. The second receiver 642 may be configured to use the specified frequency.

In an embodiment, the switching unit 1030 may connect the antenna element 1010 and the wireless communication circuit 330. The switching unit 1030 may be adapted to selectively connect the first and second feeding ports 1021 and 1022 and the first and second communication circuits 630 and 640 using a plurality of wire paths P1 to P4. The switching unit 1030 may include first to fourth switches 1031 to 1034.

In an embodiment, the switching unit 1030 may further include one or more phase shifters 1035 and 1036. However, the disclosure is not limited thereto. For example, the phase shifters 1035 and 1036 may be implemented separately outside the switching unit 1030. In any embodiment, the phase shifters 1035 and 1036 may be implemented with a wire having a specified length (e.g., a length that delays a phase as much as 90 degrees with respect to a specified frequency the wire may be referred to herein as "phase shifting circuitry").

In an embodiment, the first switch 1031 may be adapted to selectively connect the first transmitter 631 and the first receiver 632 with the first feeding port 1021 through the first wire path P1. The first wire path P1 may have a first specified length with respect to a specified frequency. The specified frequency may be a frequency that the first communication circuit 630 including the first transmitter 631 and the first receiver 632 uses. The first specified length may be a length that is set such that a phase of a point at which a signal arrives is delayed with respect to a phase of a point from which the signal departs, as much as a specified angle (e.g., 45 degrees, 90 degrees, 180 degrees, or 360 degrees).

In an embodiment, the second switch 1032 may be adapted to selectively connect the second transmitter 641 and the second receiver 642 with the second feeding port 1022 through the second wire path P2. The second wire path P2 may have a second specified length with respect to a specified frequency. The specified frequency may be a frequency that the second communication circuit 640 including the second transmitter 641 and the second receiver 642 uses. The second specified length may be a length that is set such that a phase of a point at which a signal arrives is delayed with respect to a phase of a point from which the signal departs, as much as a specified angle (e.g., 45 degrees, 90 degrees, 180 degrees, or 360 degrees).

In an embodiment, the third switch 1033 may be adapted to selectively connect the second transmitter 641 with the first feeding port 1021 through a third wire path P3, based on a communication state associated with the wireless communication circuit 330. The third wire path P3 may have a third specified length with respect to a specified frequency. A signal that is transferred using the third wire path P3 having the third specified length may be delayed with respect to a phase of a signal that is transferred using the first wire path P1 having the first specified length, as much as 90 degrees.

In an embodiment, the fourth switch 1034 may be adapted to selectively connect the first transmitter 631 with the second feeding port 1022 through a fourth wire path P4, based on a communication state associated with the wireless communication circuit 330. The fourth wire path P4 may have a fourth specified length with respect to a specified frequency. A signal that is transferred using the fourth wire path P4 having the fourth specified length may be delayed with respect to a phase of a signal that is transferred using the second wire path P2 having the second specified length, as much as 90 degrees.

In an embodiment, the phase shifters 1035 and 1036 may be positioned on the third and fourth wire paths P3 and P4. The phase shifters 1035 and 1036 may allow the third and fourth wire paths P3 and P4 to have the third and fourth specified lengths. With respect to a phase of a signal that is input to one side of each of the phase shifters 1035 and 1036, a phase of a signal that is output from an opposite side of each of the phase shifters 1035 and 1036 may be delayed as much as 90 degrees. The phase shifters 1035 and 1036 may increase lengths of the third and fourth wire paths P3 and P4 as much as ¼ times a wavelength, with respect to the specified frequencies.

In an embodiment, the electronic device 101 may be used in an environment where receive sensitivity in the first and second directions D1 and D2 satisfies a specified condition. In the case where the electronic device 101 is in a transmit/receive state where a multiple input multiple output (MIMO) environment is good, the electronic device 101 may form chains that form a plurality of paths, at the first feeding port 1021 and the second feeding port 1022. The electronic device 101 may transmit/receive both a horizontally polarized signal and a vertically polarized signal using the first feeding port 1021 and the second feeding port 1022.

In an embodiment, the electronic device 101 may further include a control circuit that identifies a communication state associated with the wireless communication circuit 330.

In an embodiment, the control circuit may connect the first receiver 632 to the first feeding port 1021 at least temporarily through the first switch 1031. The control circuit may be configured to measure strength of a signal that is received by the first receiver 632. The control circuit may be configured to identify receive sensitivity of the first communication circuit 630 as at least a portion of a communication state.

In an embodiment, the control circuit may connect the second receiver 642 to the second feeding port 1022 at least temporarily through the second switch 1032. The control circuit may be configured to measure strength of a signal that is received by the second receiver 642. The control circuit may be configured to identify receive sensitivity of the second communication circuit 640 as at least a portion of a communication state.

In an embodiment, the control circuit may establish an additional path to a feeding port, which is formed in a direction parallel to a direction in which receive sensitivity of a signal is greater than specified sensitivity, from among the first and second feeding ports 1021 and 1022 using the third and fourth switches 1033 and 1034. The control circuit may be configured to establish an addition path to feed ports that are formed in a direction in which a communication state is good. The control circuit may increase the number of paths where a communication state is good, between the antenna element 1010 and the wireless communication circuit 330.

Figure 11A:
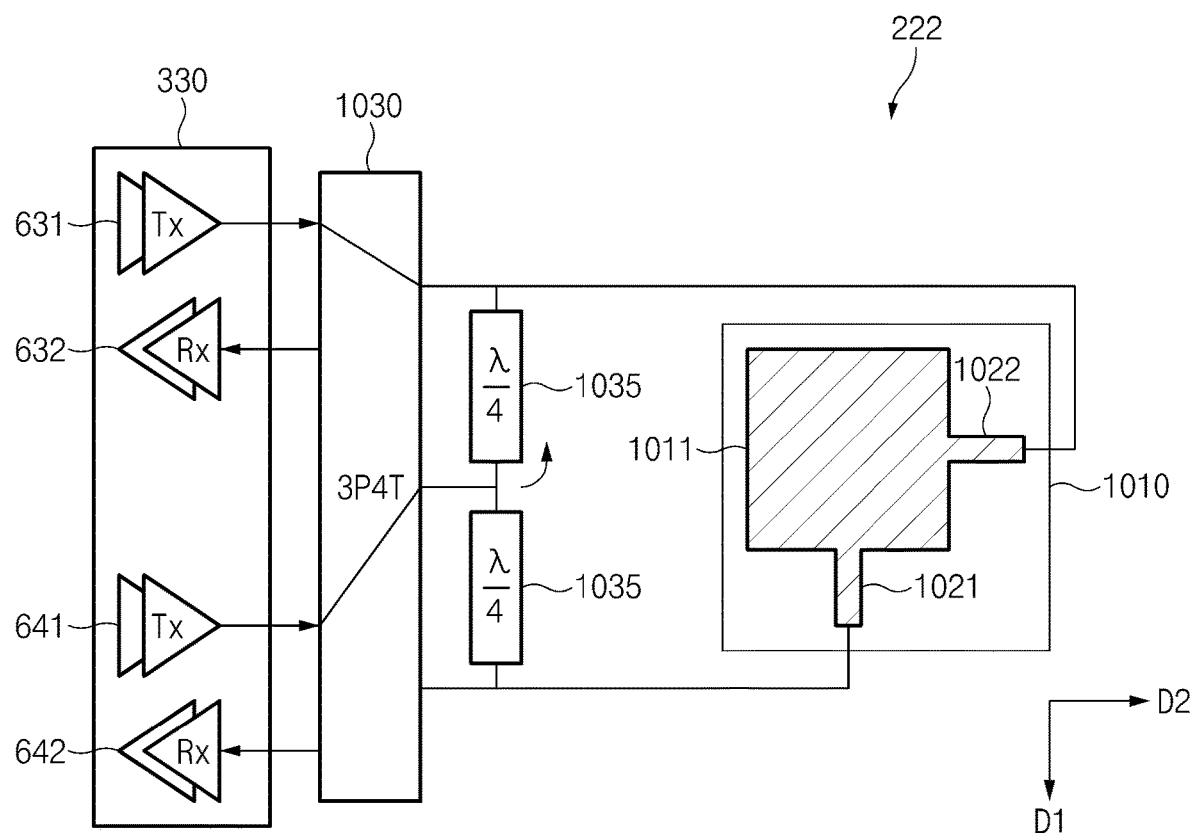
FIGS. 11A and 11B are diagrams illustrating example paths connecting an antenna element and a wireless communication circuit of an example communication device according to another embodiment.
Figure 11B:
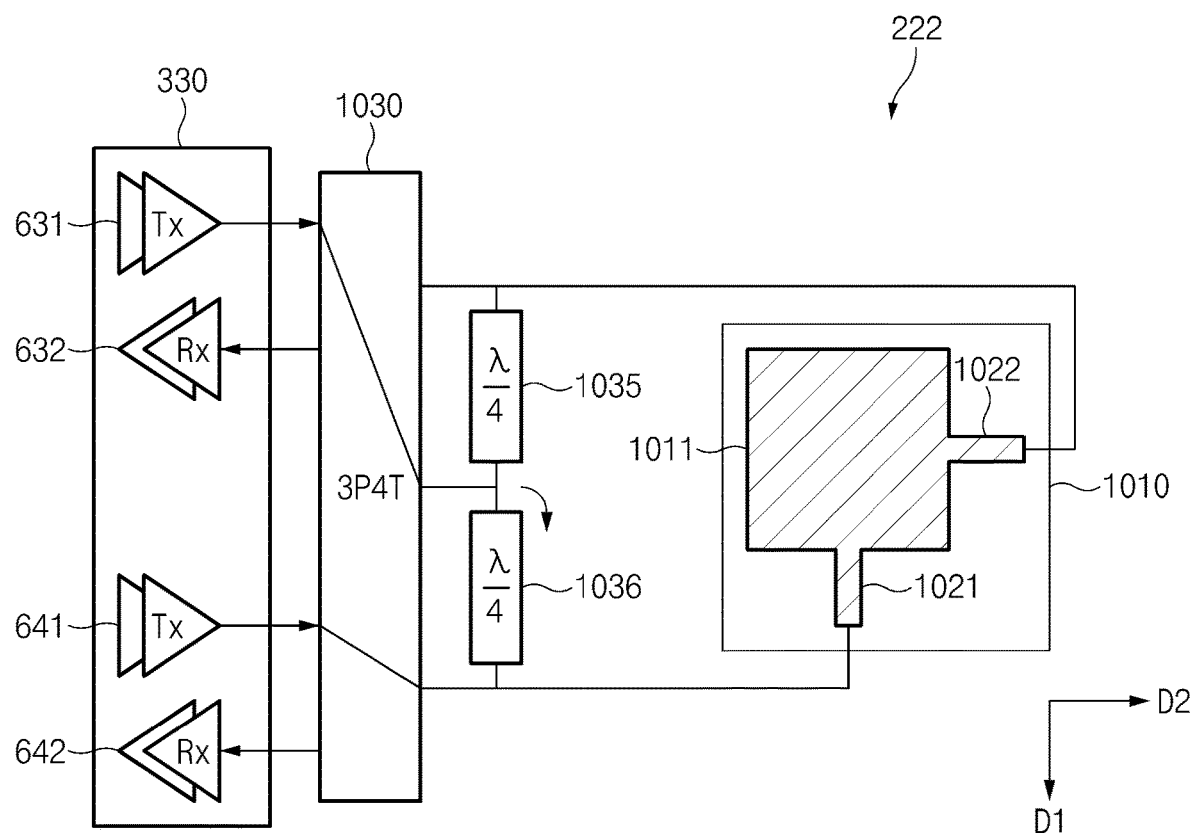

FIGS. 11A and 11B are diagrams illustrating example paths connecting the antenna element 1010 and the wireless communication circuit 330 of the communication device 222 according to another embodiment.

In an embodiment, the communication device 222 may connect the radiation part 1011 of the antenna element 1010 with the first transmitter 631, the first receiver 632, the second transmitter 641, and the second receiver 642 of the wireless communication circuit 330 using a plurality of paths. The plurality of paths may be formed between the first and second feeding ports 1021 and 1022 of the antenna element 1010 and the first transmitter 631, the first receiver 632, the second transmitter 641, and the second receiver 642.

In an embodiment, the plurality of paths may be formed using the switching unit 1030 that is implemented with one 3 pole 4 throw (3P4T) switch. The 3P4T switch may perform the same function as a combination of the first to fourth switches 1031 to 1034. The first to fourth switches 1031 to 1034 may constitute one 3P4T switch.

In an embodiment, the first to fourth switches 1031 to 1034 constituting one 3P4T switch may be implemented with one semiconductor package. The first to fourth switches 1031 to 1034 may be mounted on one RFIC.

In an embodiment, the first feeding port 1021 may transmit/receive a horizontally polarized (H Pol.) signal. The second feeding port 1022 may transmit/receive a vertically polarized (V Pol.) signal.

In an embodiment, in the case where receive sensitivity of at least one feeding port of the first and second feeding ports 1021 and 1022 is smaller than specified sensitivity, the electronic device 101 that includes the communication device 222 may allow the switching unit 1030 to operate as a Doherty power amplifier.

In an embodiment, the Doherty power amplifier may be of a structure of a power amplifier that is used in a weak electric field environment. The Doherty power amplifier may be connected with the antenna element 1010 using millimeter waves. However, the disclosure is not limited thereto. For example, the Doherty power amplifier may be connected with a legacy antenna that transmits/receives electromagnetic waves in an existing frequency band (e.g., a frequency band for long term evolution, 2G, and 3G wireless communication).

In an embodiment, the electronic device 101 that uses the communication device 222 may use the Doherty power amplifier in a weak electric field environment as a single input single output (SISO) technology. The electronic device 101 that includes the communication device 222 requires twice as many power amplifiers as before, for the purpose of connecting the switching unit 1030 to the first and second feeding ports 1021 and 1022 while applying the MIMO. The electronic device 101 that includes the communication device 222 may use power amplifiers, the number of which is the same as before, by applying the SISO for the purpose of more stable call connection, rather than throughput, in a weak electric field environment.

In an embodiment, the electronic device 101 that includes the communication device 222 may be used in an environment where receive sensitivity of a vertically polarized signal is not smaller than specified receive sensitivity, as illustrated in FIG. 11A. The electronic device 101 that includes the communication device 222 may determine that a communication state of the second feeding port 1022 formed in the second direction D2 satisfies a specified condition. The communication device 222 may establish an additional path to the second feeding port 1022 using the Doherty power amplifier structure of the switching unit 1030. When, in a weak electric field environment, receive sensitivity of a horizontally polarized signal is not good and receive sensitivity of a vertically polarized signal is good, the communication device 222 may improve efficiency of a power amplifier.

In an embodiment, the electronic device 101 that includes the communication device 222 may disconnect the first feeding port 1021 from the first transmitter 631 using the switching unit 1030. The electronic device 101 that includes the communication device 222 may disconnect the first feeding port 1021 from the second transmitter 641 using the switching unit 1030.

In an embodiment, the electronic device 101 that includes the communication device 222 may connect the second feeding port 1022 and the first transmitter 631 using the switching unit 1030. The electronic device 101 that includes the communication device 222 may connect the second feeding port 1022 and the second transmitter 641 using the switching unit 1030.

In an embodiment, the electronic device 101 that includes the communication device 222 may additionally establish paths connecting the antenna element 1010 and the wireless communication circuit 330 using the second feeding port 1022 that provide a communication state satisfying a specified condition. Without increasing the number of feeding ports, the electronic device 101 that includes the communication device 222 may increase the number of paths connecting the antenna element 1010 and the wireless communication circuit 330 while satisfying the specified condition with regard to the communication state.

In an embodiment, even in the case where the receive sensitivity of the horizontally polarized signal is smaller than the specified receive sensitivity, the electronic device 101 that includes the communication device 222 may connect the antenna element 1010 and the wireless communication circuit 330 using paths, the number of which is the same as the number of paths corresponding to an environment where the receive sensitivity of the vertically polarized signal and the horizontally polarized signal is not smaller than the specified receive sensitivity.

In an embodiment, the communication device 222 may allow a path connecting the second feeding port 1022 and the second transmitter 641 to pass through the first phase shifter 1035. The communication device 222 may allow a phase of a path connecting the second feeding port 1022 and the second transmitter 641 to be delayed with respect to a phase of a path connecting the second feeding port 1022 and the first transmitter 631 as much as 90 degrees, using the first phase shifter 1035.

In an embodiment, the electronic device 101 that includes the communication device 222 may be used in an environment where receive sensitivity of a horizontally polarized signal is not smaller than the specified receive sensitivity, as illustrated in FIG. 11B. The electronic device 101 that includes the communication device 222 may determine that a communication state of the first feeding port 1021 formed in the first direction D1 satisfies a specified condition. The communication device 222 may establish an additional path to the first feeding port 1021 using the Doherty power amplifier structure of the switching unit 1030. When, in a weak electric field environment, receive sensitivity of a vertically polarized signal is not good and receive sensitivity of a horizontally polarized signal is good, the communication device 222 may improve efficiency of a power amplifier.

In an embodiment, the electronic device 101 that includes the communication device 222 may connect the first feeding port 1021 and the first transmitter 631 using the switching unit 1030. The electronic device 101 that includes the communication device 222 may connect the first feeding port 1021 and the second transmitter 641 using the switching unit 1030.

In an embodiment, the electronic device 101 that includes the communication device 222 may disconnect the second feeding port 1022 from the first transmitter 631 using the switching unit 1030. The electronic device 101 that includes the communication device 222 may disconnect the second feeding port 1022 from the second transmitter 641 using the switching unit 1030.

In an embodiment, the electronic device 101 that includes the communication device 222 may additionally establish paths connecting the antenna element 1010 and the wireless communication circuit 330 using the first feeding port 1021 that provide a communication state satisfying a specified condition. Without increasing the number of feeding ports, the electronic device 101 that includes the communication device 222 may increase the number of paths connecting the antenna element 1010 and the wireless communication circuit 330 while satisfying the specified condition with regard to the communication state.

In an embodiment, even in the case where the receive sensitivity of the vertically polarized signal is smaller than the specified receive sensitivity, the electronic device 101 that includes the communication device 222 may connect the antenna element 1010 and the wireless communication circuit 330 using paths, the number of which is the same as the number of paths corresponding to an environment where the receive sensitivity of the vertically polarized signal and the horizontally polarized signal is not smaller than the specified receive sensitivity.

In an embodiment, the communication device 222 may allow a path connecting the first feeding port 1021 and the first transmitter 631 to pass through the second phase shifter 1036. The communication device 222 may allow a phase of a path connecting the first feeding port 1021 and the first transmitter 631 to be delayed with respect to a phase of a path connecting the first feeding port 1021 and the second transmitter 641 as much as 90 degrees, using the second phase shifter 1036.

Figure 12:
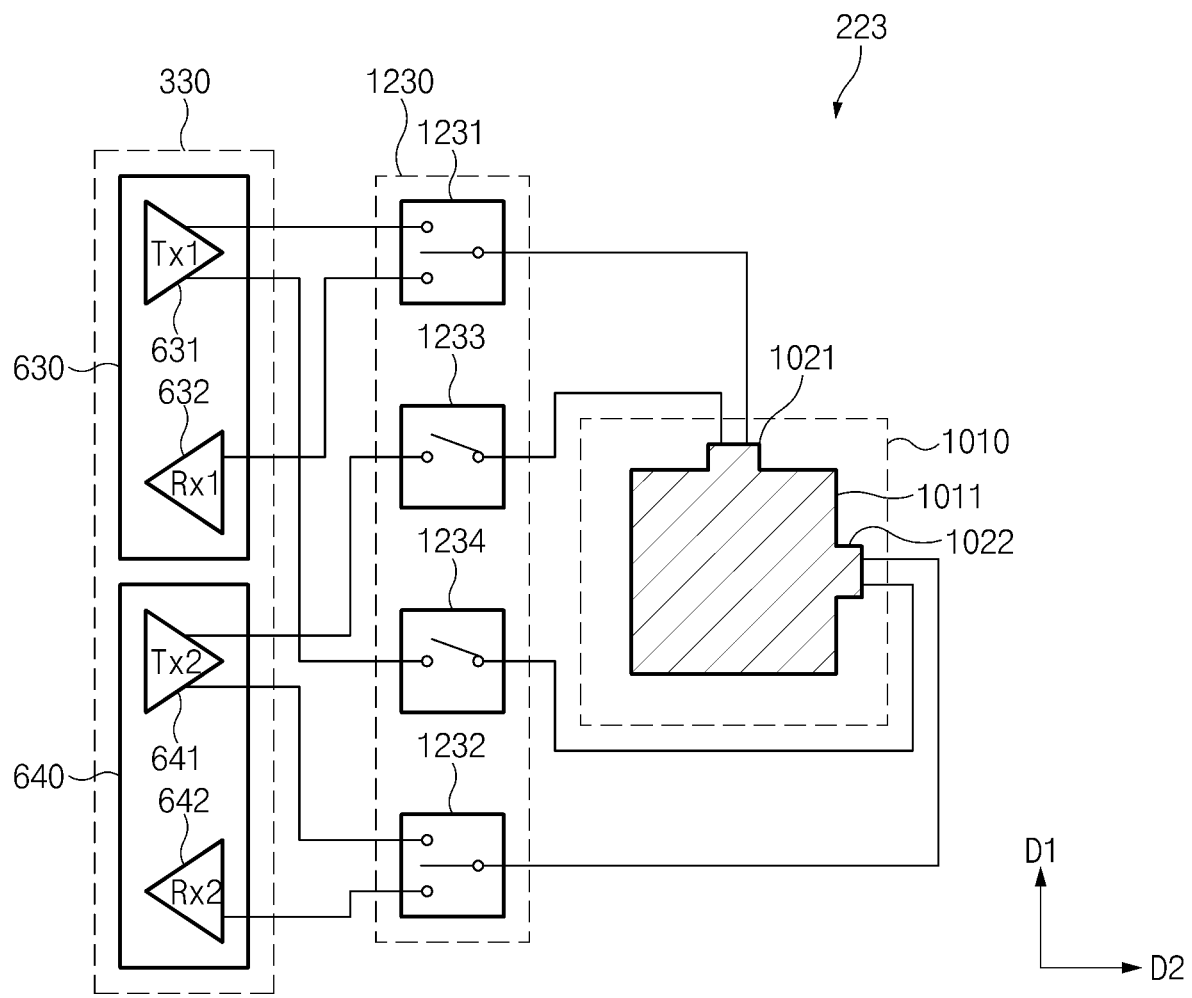
FIG. 12 is a diagram illustrating an example communication device according to another embodiment.

FIG. 12 is a diagram illustrating an example communication device (e.g., the third communication device 223 of FIG. 2) according to another embodiment.

The communication device 223 according to another embodiment may include the antenna element 1010, the wireless communication circuit 330, and a switching unit 1230. With regard to the antenna element 1010, the wireless communication circuit 330, and the switching unit 1230 of the communication device 223 according to another embodiment, additional description of functions and roles that are the same as those of the antenna element 1010, the wireless communication circuit 330, and the switching unit 1030 of the communication device 221 according to another embodiment will not be repeated here to avoid redundancy.

In an embodiment, the switching unit 1230 may connect the antenna element 1010 and the wireless communication circuit 330. The switching unit 1230 may include first to fourth switches 1231 to 1234.

In an embodiment, the first switch 1231 may be adapted to selectively connect the first transmitter 631 and the first receiver 632 with the first feeding port 1021. The second switch 1232 may be adapted to selectively connect the second transmitter 641 and the second receiver 642 with the second feeding port 1022.

In an embodiment, the third switch 1233 may be adapted to selectively connect the second transmitter 641 with the first feeding port 1021, based on a communication state associated with the wireless communication circuit 330. In the case where a communication state of the second communication circuit 640 satisfies a specified state, the third switch 1233 may connect the second transmitter 641 with the first feeding port 1021.

In an embodiment, the fourth switch 1234 may be adapted to selectively connect the first transmitter 631 with the second feeding port 1022, based on a communication state associated with the wireless communication circuit 330. In the case where a communication state of the first communication circuit 630 satisfies a specified state, the fourth switch 1234 may connect the first transmitter 631 with the second feeding port 1022.

In an embodiment, the electronic device 101 may further include a control circuit that identifies a communication state associated with the wireless communication circuit 330. The control circuit may connect the first receiver 632 to the first feeding port 1021 at least temporarily through the first switch 1231. The control circuit may be configured to identify receive sensitivity of the first communication circuit 630 as at least a portion of a communication state. The control circuit may connect the second receiver 642 to the second feeding port 1022 at least temporarily through the second switch 1232. The control circuit may be configured to identify receive sensitivity of the second communication circuit 640 as at least a portion of a communication state.

Figure 13:
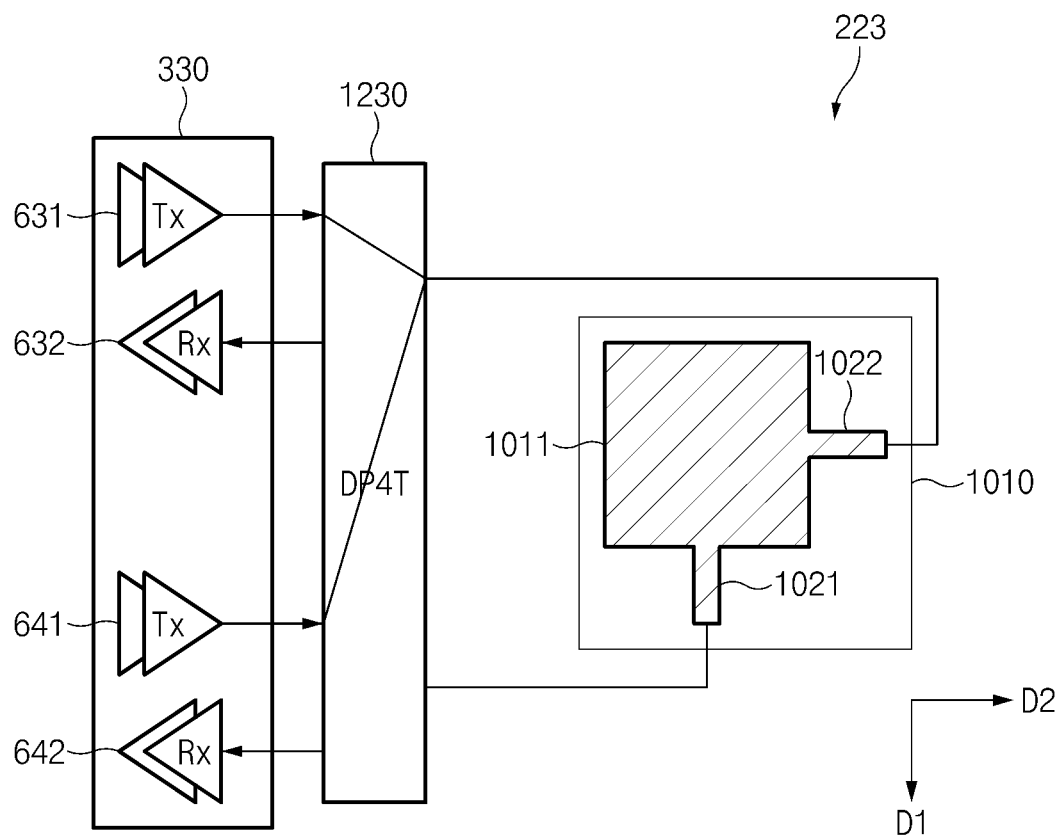
FIG. 13 is a diagram illustrating example paths connecting an antenna element and a wireless communication circuit of an example communication device according to another embodiment.

FIG. 13 is a diagram illustrating example paths connecting the antenna element 1010 and the wireless communication circuit 330 of the communication device 223 according to another embodiment.

In an embodiment, the switching unit 1230 of the communication device 223 may be implemented using on double pole 4 throw (DP4T) switch. The DP4T switch may perform the same function as a combination of the first to fourth switches 1231 to 1234.

In an embodiment, the first to fourth switches 1231 to 1234 constituting one DP4T switch may be implemented with one semiconductor package. The first to fourth switches 1231 to 1234 may be mounted on one RFIC.

In an embodiment, the first feeding port 1021 may transmit/receive a horizontally polarized (H Pol.) signal. The second feeding port 1022 may transmit/receive a vertically polarized (V Pol.) signal.

In an embodiment, upon connecting the antenna element 1010 and the wireless communication circuit 330 using the switching unit 1230, the electronic device 101 that includes the communication device 223 may bind two chains respectively corresponding to paths of the first and second transmitters 631 and 641. Upon connecting the antenna element 1010 and the wireless communication circuit 330 using the switching unit 1230, the electronic device 101 that includes the communication device 223 may bind Tx chains associated with the first and second transmitters 631 and 641, thus improving the transmission performance as much as about twice (3 dB).

In an embodiment, the electronic device 101 that includes the communication device 223 may connect both the first transmitter 631 and the second transmitter 641 to a feeding port, which is formed in a direction parallel to a direction in which receive sensitivity of a signal is greater than specified sensitivity, from among the first and second feeding ports 1021 and 1022 using the switching unit 1230. For example, in the case where receive sensitivity of the first feeding port 1021 is excellent, the electronic device 101 that includes the communication device 223 may connect both the first transmitter 631 and the second transmitter 641 to the first feeding port 1021. By connecting both the first transmitter 631 and the second transmitter 641 to feeding ports formed in a direction where a communication state is good, the electronic device 101 that includes the communication device 223 may maintain the number of paths where a communication state between the antenna element 1010 and the wireless communication circuit 330 is good.

Figure 14:
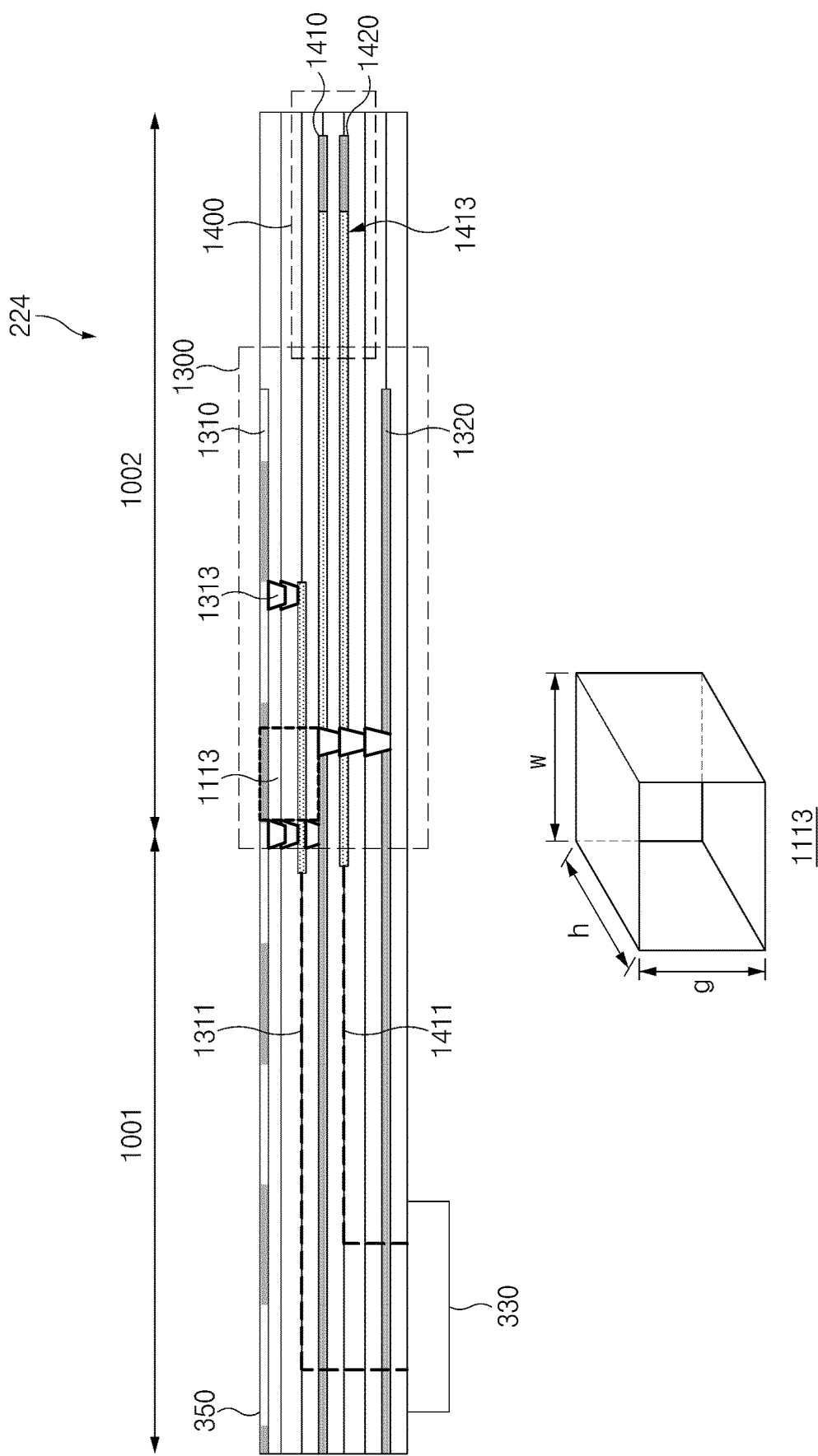
FIG. 14 is a cross-sectional diagram illustrating an example communication device according to an embodiment.

FIG. 14 is a cross-sectional diagram illustrating an example communication device (e.g., the fourth communication device 224 of FIG. 2) according to another embodiment.

Referring to FIG. 14, the communication device 224 according to an embodiment may include a first antenna 1300 for vertical polarization and a second antenna 1400 for horizontal polarization. The first antenna 1300 may include at least one antenna element 1310 or 1320. For example, the first antenna 1300 may include a first antenna element 1310 and a second antenna element 1320. The second antenna 1400 may include at least one antenna element 1410 or 1420. For example, the second antenna 1400 may include a third antenna element 1410 and a fourth antenna element 1420.

In various embodiments, the first antenna element 1310 and the second antenna element 1320 may be referred to as a "conductive plate". The third antenna element 1410 and the fourth antenna element 1420 may be referred to as a "conductive element" (e.g., a conductive pattern).

In various embodiments, the communication device 224 may include a first antenna array including a plurality of first antennas 1300 and a second antenna array including a plurality of second antennas 1400. For example, the first antenna array may be referred to a "vertically polarized antenna array", and the second antenna array may be referred to as a "horizontally polarized antenna array".

In an embodiment, the first antenna element 1310 may be spaced from the second antenna element 1320 and may be positioned parallel to the second antenna element 1320. The second antenna 1400 may be positioned in a space between the first antenna element 1310 and the second antenna element 1320.

In an embodiment, the communication device 224 may include the PCB 350. The PCB 350 may include at least a portion of the first antenna 1300 and the second antenna 1400. For example, the first antenna element 1310, the second antenna element 1320, the third antenna element 1410, and the fourth antenna element 1420 may be formed of a conductive plate or a conductive pattern on the PCB 350. Alternatively, the PCB 350 may support the first antenna element 1310, the second antenna element 1320, the third antenna element 1410, and the fourth antenna element 1420 implemented with separate conductive patterns. For example, at least one side of the first antenna element 1310, at least one side of the second antenna element 1320, and one end of the second antenna 1400 may be supported by the PCB 350.

In an embodiment, the communication device 224 may include the wireless communication circuit 330 that are electrically connected to the first antenna 1300 and the second antenna 1400. The wireless communication circuit 330 may transmit/receive an RF signal of a vertical polarization characteristic using the first antenna 1300. For example, the wireless communication circuit 330 may apply the RF signal to the first antenna 1300 through a first feeder 1313. The wireless communication circuit 330 may transmit/receive an RF signal of a horizontal polarization characteristic using the second antenna 1400. For example, the wireless communication circuit 330 may apply the RF signal to the second antenna 1400 through a second feeder 1413.

In an embodiment, the wireless communication circuit 330 may supply a power to the first antenna element 1310 through the first feeder 1313 included in the first antenna element 1310. The first feeder 1313 may be electrically connected with the wireless communication circuit 330 through a first feeding line 1311. The second antenna element 1320 may be electrically connected with a ground area of the PCB 350. In various embodiments, the first antenna 1300 may function as a patch antenna.

In various embodiments, the PCB 350 may include a cavity 1113 for impedance matching. The cavity 1113 may be referred to as a "matching area" for impedance matching of the first antenna 1300. For example, the cavity 1113 may be referred to as an "empty space" that has a transverse length "w", a longitudinal length "h", and a height length "h". The transverse length "w", the longitudinal length "h", and the height length "h" may be associated with impedance matching.

For example, an inductance and a capacitance which are determined by the transverse length "w", the longitudinal length "h", and the height length "h" of the cavity 1113 may be utilized for impedance matching for the first antenna 1300. For example, the cavity 1113 may be used as a matching circuit.

In an embodiment, the wireless communication circuit 330 may supply a power to the second antenna 1400 through a second feeder 1413 of the second antenna 1400. The second feeder 1413 may be electrically connected with the wireless communication circuit 330 through a second feeding line 1411. In various embodiments, the second antenna 1400 may function as a dipole antenna.

In various embodiments, the second antenna 1400 may have one feeder (a single feed structure) or may have two feeders (a dual feed structure). The second antenna 1400 may include one or two conductive elements. A conductive element may function as a radiator of the dipole antenna.

In an embodiment, the second antenna 1400 may include the third antenna element 1410 or the fourth antenna element 1420. For example, a dipole antenna including two antenna elements is exemplified in FIG. 14.

In an embodiment, the second feeder 1413 may be positioned at the third antenna element 1410. One end of the fourth antenna element 1420 may be electrically connected with a ground area of the PCB 350.

In various embodiments, the PCB 350 may include a first area 1001 and a second area 1002 being the remaining area other than the first area 1001.

In an embodiment, the first area 1001 may be an area where the first feeding line 1311 and the second feeding line 1411 are positioned. The first area 1001 may include a ground layer. The second antenna element 1320 and the fourth antenna element 1420 may be extended from the ground layer.

In an embodiment, the second area 1002 may be an area where the first antenna 1300 and the second antenna 1400 are positioned. A feeding network may be implemented in the second area 1002 using the second feeder 1413.

In various embodiments, under control of a processor (e.g., the processor 120 of FIG. 1) of an electronic device, the wireless communication circuit 330 may transmit/receive a millimeter wave (mmWave) of about 20 GHz or higher depending on a vertical polarization or horizontal polarization transmit/receive control signal.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments of the disclosure, an electronic device may selectively connect transmitters and receivers with feeding ports where reception strength of a signal is strong, using a plurality of switches. The electronic device may control a plurality of paths transferring signals from a plurality of antenna elements to an RFIC such that reception strength of a signal is strong. The electronic device may receive or transmit a signal using only paths satisfying a specified condition when a receive or transmit signal is polarized in a specified direction. As such, the electronic device may improve reception performance and transmission performance of a signal.

Also, the electronic device may improve reception performance and transmission performance by efficiently utilizing elements positioned within the RFIC in an environment where an MIMO environment is not good. The electronic device may selectively connect or disconnect a plurality of feeding ports using a plurality of switches depending on receive sensitivity. As such, the electronic device may reduce unnecessary power consumption when there is maintained a state where a power is supplied using all feeding ports.

While the disclosure has been illustrated and described with reference to various example embodiments thereof, it will be understood by those skilled in the art that various changes in form and details may be made therein without departing from the spirit and scope of the disclosure as defined, for example, by the appended claims and their equivalents.

What is claimed is:

1. An electronic device comprising:
an antenna including a radiation part emitting signal transmitted from a wireless communication circuit, a first feeding port provided in a first direction of the radiation part, a second feeding port provided in a second direction perpendicular to the first direction of the radiation part, a third feeding port provided in a direction facing away from the first direction, and a fourth feeding port provided in a direction facing away from the second direction;
a first communication circuit and a second communication circuit included in the wireless communication circuit, the first communication circuit including a first transmitter and a first receiver and the second communication circuit including a second transmitter and a second receiver;
a first switch configured to selectively connect the first transmitter and the first receiver with the first feeding port;
a second switch configured to selectively connect the first transmitter and the first receiver with the second feeding port;
a third switch configured to selectively connect the second transmitter and the second receiver with the third feeding port; and
a fourth switch configured to selectively connect the second transmitter and the second receiver with the fourth feeding port.

2. The electronic device of claim 1, wherein the radiation part is a quadrilateral patch or a circular patch.

3. The electronic device of claim 1, further comprising:
a control circuit configured to identify a communication state associated with the wireless communication circuit,
wherein the control circuit is configured to:
at least temporarily connect the first receiver to the first feeding port through the first switch to identify a receive sensitivity of the first communication circuit in the first direction as at least a portion of the communication state; and
at least temporarily connect the first receiver to the second feeding port through the second switch to identify a receive sensitivity of the first communication circuit in the second direction as at least a portion of the communication state.

4. The electronic device of claim 3, wherein the control circuit is configured to:
at least temporarily connect the second receiver to the third feeding port through the third switch to identify a receive sensitivity of the second communication circuit in the first direction as at least a portion of the communication state; and
at least temporarily connect the second receiver to the fourth feeding port through the fourth switch to identify a receive sensitivity of the second communication circuit in the second direction as at least a portion of the communication state.

5. The electronic device of claim 1, wherein the first switch and the second switch comprise a first double pole double throw (DPDT) switch,
wherein the third switch and the fourth switch comprise a second DPDT switch, and
wherein the first DPDT switch and the second DPDT switch are provided in one semiconductor package.

6. The electronic device of claim 1, wherein the first feeding port and the third feeding port are configured to receive a horizontally polarized signal,
wherein the second feeding port and the fourth feeding port are configured to receive a vertically polarized signal,
the electronic device further comprising:
a control circuit configured to identify a communication state associated with the wireless communication circuit, wherein the control circuit is configured to:
identify a receive sensitivity of the horizontally polarized signal and a receive sensitivity of the vertically polarized signal as at least a portion of the communication state.

7. The electronic device of claim 6, wherein, the control circuit is configured to connect the first feeding port and the third feeding port with the wireless communication circuit based on the receive sensitivity of the horizontally polarized signal satisfying a specified condition, and
wherein, the control circuit is configured to connect the second feeding port and the fourth feeding port with the wireless communication circuit based on the receive sensitivity of the vertically polarized signal satisfying the specified condition.

8. An electronic device comprising:
an antenna including a radiation part emitting signal transmitted from a wireless communication circuit, a first feeding port provided in a first direction of the radiation part, and a second feeding port provided in a second direction perpendicular to the first direction of the radiation part;
a first communication circuit and a second communication circuit included in the wireless communication circuit, the first communication circuit including a first transmitter and a first receiver configured to use a specified frequency, and the second communication circuit including a second transmitter and a second receiver configured to use the specified frequency;
a first switch configured to selectively connect the first transmitter and the first receiver with the first feeding port through a first wire path having a first specified length with regard to the specified frequency;
a second switch configured to selectively connect the second transmitter and the second receiver with the second feeding port through a second wire path having a second specified length with regard to the specified frequency; and
a third switch configured to selectively connect the second transmitter with the first feeding port through a third wire path wherein a phase is delayed with respect to the first specified length by as much as 90 degrees, based on a communication state associated with the wireless communication circuit.

9. The electronic device of claim 8, further comprising:
a fourth switch configured to selectively connect the first transmitter with the second feeding port through a fourth wire path wherein a phase is delayed with respect to the second specified length by as much as 90 degrees, based on the communication state associated with the wireless communication circuit.

10. The electronic device of claim 8, further comprising:
a control circuit,
wherein the control circuit is configured to:
at least temporarily connect the first receiver to the first feeding port through the first switch to identify a receive sensitivity of the first communication circuit as at least a portion of the communication state.

11. The electronic device of claim 10, wherein the control circuit is configured to:
at least temporarily connect the second receiver to the second feeding port through the second switch to identify a receive sensitivity of the second communication circuit as at least a portion of the communication state.

12. The electronic device of claim 10, wherein, the control circuit is configured to: connect the first transmitter and the first feeding port, connect the second transmitter and the first feeding port, disconnect the first transmitter from the second feeding port, and disconnect the second transmitter from the second feeding port based on the receive sensitivity satisfying a specified condition.

13. The electronic device of claim 10, wherein, the control circuit is configured to: disconnect the first transmitter from the first feeding port, disconnect the second transmitter from the first feeding port, connect the first transmitter and the second feeding port, and connect the second transmitter and the second feeding port based on the receive sensitivity satisfying another specified condition.

14. The electronic device of claim 8, wherein the first switch, the second switch and the third switch are provided in one 3 pole 4 throw (3P4T) semiconductor package.

15. An electronic device comprising:
an antenna including a radiation part emitting signal transmitted from a wireless communication circuit, a first feeding port provided in a first direction of the radiation part, and a second feeding port provided in a second direction perpendicular to the first direction of the radiation part;
a first communication circuit and a second communication circuit included in the wireless communication circuit, the first communication circuit including a first transmitter and a first receiver and the second communication circuit including a second transmitter and a second receiver;
a first switch configured to selectively connect the first transmitter and the first receiver with the first feeding port;
a second switch configured to selectively connect the second transmitter and the second receiver with the second feeding port; and
a third switch configured to selectively connect the second transmitter with the first feeding port, based on a communication state associated with the wireless communication circuit.

16. The electronic device of claim 15, further comprising:
a control circuit,
wherein the control circuit is configured to:
at least temporarily connect the second receiver to the second feeding port through the second switch to identify a receive sensitivity of the second communication circuit as at least a portion of the communication state.

17. The electronic device of claim 15, further comprising:
a fourth switch configured to selectively connect the first transmitter with the second feeding port, based on the communication state associated with the wireless communication circuit.

18. The electronic device of claim 17, further comprising:
a control circuit; and
a phase shifter comprising phase shifting circuitry connected with at least one transmitter of the first transmitter and the second transmitter,
wherein the control circuit is configured to:
at least temporarily connect the first receiver to the first feeding port through the first switch to identify a receive sensitivity of the first communication circuit as at least a portion of the communication state.

19. The electronic device of claim 16, wherein, the control circuit is configured to: connect the first transmitter and the first feeding port through the first switch, disconnect the second transmitter from the second feeding port through the second switch, and connect the second transmitter and the first feeding port through the third switch based on the receive sensitivity satisfying a specified condition.

20. The electronic device of claim 16, wherein, the control circuit is configured to: connect the first transmitter and the first feeding port through the first switch, connect the second transmitter and the second feeding port through the second switch, and disconnect the second transmitter from the first feeding port through the third switch based on the receive sensitivity satisfying another specified condition.

21. The electronic device of claim 15, wherein the first switch, the second switch and the third switch are provided in one double pole 4 throw (DP4T) semiconductor package.

22. The electronic device of claim 15, further comprising:
a phase shifter comprising phase shifting circuitry connected with at least one transmitter of the first transmitter and the second transmitter.

* * * * *